United States Patent
Takikawa et al.

(10) Patent No.: US 7,239,073 B2
(45) Date of Patent: Jul. 3, 2007

(54) CARBON SUBSTANCE AND METHOD FOR MANUFACTURING THE SAME, ELECTRON EMISSION ELEMENT AND COMPOSITE MATERIALS

(75) Inventors: Hirofumi Takikawa, Aichi (JP); Youhei Fujimura, Aichi (JP); Shigeo Itoh, Chiba (JP)

(73) Assignee: Futaba Corporation, Chiba (JP)

( * ) Notice: Subject to any disclaimer, the term of this patent is extended or adjusted under 35 U.S.C. 154(b) by 175 days.

(21) Appl. No.: 10/780,714

(22) Filed: Feb. 19, 2004

(65) Prior Publication Data

US 2004/0160157 A1 Aug. 19, 2004

(30) Foreign Application Priority Data

Feb. 19, 2003 (JP) .............................. 2003-041835

(51) Int. Cl.
*H01J 1/62* (2006.01)
(52) U.S. Cl. ....................................... 313/495; 977/949
(58) Field of Classification Search ................ 313/509, 313/495; 977/939, 949–50, 950
See application file for complete search history.

(56) References Cited

U.S. PATENT DOCUMENTS

| | | | | |
|---|---|---|---|---|
| 5,773,921 A * | 6/1998 | Keesmann et al. | ......... | 313/309 |
| 5,872,422 A * | 2/1999 | Xu et al. | ..................... | 313/311 |
| 5,973,444 A * | 10/1999 | Xu et al. | ..................... | 313/309 |
| 6,531,828 B2 * | 3/2003 | Yaniv et al. | ............. | 315/169.3 |
| 6,553,096 B1 * | 4/2003 | Zhou et al. | .................. | 378/122 |
| 6,628,053 B1 * | 9/2003 | Den et al. | .................... | 313/310 |
| 6,664,728 B2 * | 12/2003 | Pavlovsky et al. | .......... | 313/495 |
| 6,692,718 B1 * | 2/2004 | Osawa | ........................ | 423/448 |
| 6,891,320 B2 * | 5/2005 | Nakamoto | .................. | 313/311 |
| 6,991,949 B2 * | 1/2006 | Muroyama et al. | ........... | 438/20 |
| 7,018,261 B2 * | 3/2006 | Perlo et al. | .................... | 445/48 |
| 2002/0127162 A1 * | 9/2002 | Smalley et al. | ............. | 422/198 |
| 2003/0082092 A1 * | 5/2003 | Nettleton | ................. | 423/447.2 |
| 2003/0197456 A1 * | 10/2003 | Den et al. | .................... | 313/309 |
| 2003/0227243 A1 * | 12/2003 | Perlo et al. | ................. | 313/316 |
| 2004/0046755 A1 * | 3/2004 | Okai et al. | ................... | 345/204 |
| 2004/0076576 A1 * | 4/2004 | Lee et al. | ............... | 423/445 R |

\* cited by examiner

*Primary Examiner*—Edward J. Glick
*Assistant Examiner*—Anastasia Midkiff
(74) *Attorney, Agent, or Firm*—Bacon & Thomas PLLC

(57) ABSTRACT

A carbon substance comprises a structure and line-shaped bodies, the structure having a size ranging from about 1 μm to about 100 μm and including carbon and a metal or a metallic oxide, and the line-shaped bodies having diameters smaller than about 200 nm and including carbon as a main component thereof and growing radially from a surface of the structure. A method for manufacturing the carbon substance uses a thermal decomposition of a source gas containing carbon in the vicinity of a catalyst, wherein the catalyst comprises a first and a second materials, the first material being Ni or a Ni oxide and the second material being In or an In oxide; and the thermal decomposition is performed at a temperature ranging from about 675° C. to about 750° C. An electron emission element uses the carbon substance as an electron emission material. A composite material includes the carbon substance in its matrix.

16 Claims, 31 Drawing Sheets

CARBON SUBSTANCE AND METHOD FOR MANUFACTURING THE SAME, ELECTRON EMISSION ELEMENT AND COMPOSITE MATERIALS

FIELD OF THE INVENTION

The present invention relates to a carbon substance and a method for manufacturing the same, an electron emission element employing the carbon substance as an electron source and a composite material including the carbon substance in a matrix thereof.

BACKGROUND OF THE INVENTION

An electric field electron emission element is a cold-cathode which consumes less energy and has an extended life longer than a thermionic emission element which has to be heated. The electric field electron emission element needs to employ an electron emission material which has such a small curvature at a vertical hem thereof that an electron can be emitted at a low voltage at an improved electron emission efficiency.

In this regard, recently, carbon fiber materials such as carbon microfiber have been noticed as an electron emission material of the electric field electron emission element. Out of these materials, a carbon nanofiber such as carbon nanotube of a nanoscale size is particularly distinguished. A carbon nanofiber, whose external diameter ranges approximately from 1 to 100 nm and length of a few μm's, can be properly shaped to perform the field electron emission at a low voltage. Further, since the component material, i.e., carbon, is chemically stable and mechanically strong, it is an ideal material for electron emission element.

Conventionally, a carbon fiber has been produced by employing a laser ablation method, an arc discharge method using arc discharge between graphite electrodes in a vacuum state or in inert gas, a CVD (chemical vapor deposition) method, or the like. Since the CVD method is capable of producing a carbon fiber with a better regularity than other methods, it has received more attention recently.

In case a carbon fiber, e.g., a carbon nanotube, is used as an electron emission material, the carbon nanotube is desirably arranged in a direction along an electric field (generally, a direction perpendicular to a substrate on which the carbon nanotube is arranged) for concentration of the electric field. Since the carbon nanotube has a thread shape, however, most carbon nanotube's vertical hems are not arranged perpendicular to the substrate when the carbon nanotubes are simply deposited on the substrate; and, therefore, irregularity occurs when a low voltage is applied.

SUMMARY OF THE INVENTION

It is, therefore, a primary object of the present invention to provide a carbon substance having various uses, which is suitable particularly for an electron emission element and a method for manufacturing the same.

It is another object of the present invention to provide an electron emission element having a superior electron emission characteristic.

It is a further object of the present invention to provide a carbon substance which better adheres to matrices of various kinds.

In accordance with one aspect of the present invention, there is provided a carbon substance comprising: a structure having a size ranging from about 1 μm to about 100 μm and including carbon and a metal or a metallic oxide; and a plurality of line-shaped bodies whose diameters are smaller than about 200 nm, wherein the line-shaped bodies include carbon as a main component thereof and grow radially from a surface of the structure.

In accordance with another aspect of the present invention, there is provided a method for manufacturing a carbon substance by a thermal decomposition of a source gas containing carbon in the vicinity of a catalyst, wherein the catalyst includes a first and a second materials, the first material being Ni or a Ni oxide and the second material being In or an In oxide; and the thermal decomposition is performed at a temperature ranging from about 675° C. to about 750° C., and wherein the carbon substance includes a structure having a size ranging from about 1 μm to about 100 μm and including carbon and a metal or a metallic oxide and a plurality of line-shaped bodies whose diameters are smaller than about 200 nm, the line-shaped bodies including carbon as a main component thereof and growing radially from a surface of the structure.

In accordance with a further aspect of the present invention, there is provided a carbon substance comprising: one or more structures, each having a size ranging from about 1 μm to about 100 μm and including carbon and a metal or a metallic oxide; and one or more line-shaped bodies whose diameters range from about 50 nm to about 1 μm, wherein the line-shaped bodies include carbon as a main component thereof and grow from surfaces of the structures.

In accordance with still another aspect of the present invention, there is provided a method for manufacturing a carbon substance by thermal decomposition of a source gas having carbon in the vicinity of a catalyst, wherein the catalyst comprises a first material and a second material, the first material being Ni or a Ni oxide and the second material being In or an In oxide; and the thermal decomposition is performed at a temperature ranging from about 550° C. to about 700° C., and wherein the carbon substance comprises one or more structures, each having a size ranging from about 1 μm to about 100 μm and including carbon and a metal or a metallic oxide and one or more line-shaped bodies whose diameters range from about 50 nm to about 1 μm, the line-shaped bodies including carbon as a main component thereof and growing from surfaces of the structures.

In accordance with a still further aspect of the present invention, there is provided an electron emission element which emits electrons from an electron emission material by using a voltage difference between a first electrode and a second electrode, wherein the electron emission material is arranged on the first electrode and the second electrode is arranged facing the electron emission material, wherein the electron emission material comprises the above carbon substance.

In accordance with vet another aspect of the present invention, there is provided a composite material comprising the above carbon substance in its matrix.

BRIEF DESCRIPTION OF THE DRAWINGS

The above and other objects and features of the present invention will become apparent from the following description of preferred embodiments given in conjunction with the accompanying drawings, in which.

Figure 1:
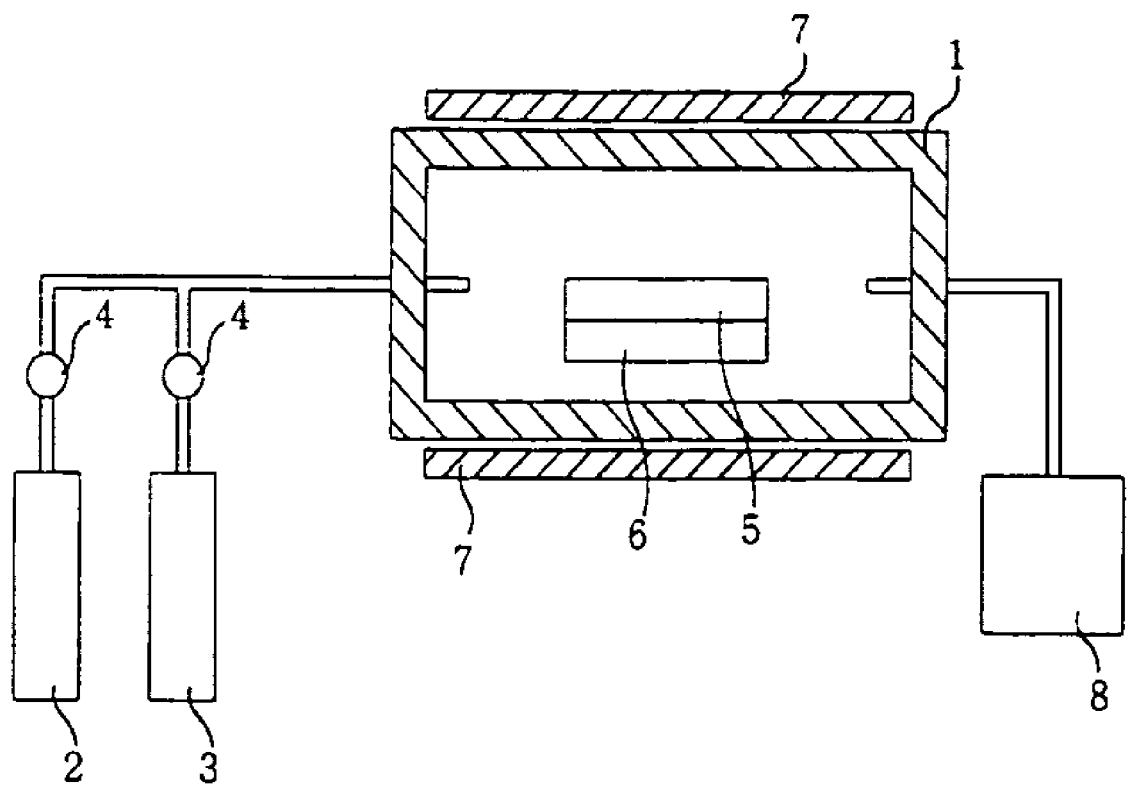
FIG. 1 schematically shows a device used in a method for manufacturing a carbon substance in accordance with preferred embodiments of the present invention.

DETAILED DESCRIPTION OF THE
PREFERRED EMBODIMENTS

As is shown in FIGS. 3 to 23, carbon substances (carbon fine particles) in accordance with the present invention have new structures.

A first carbon substance in accordance with the present invention includes: a structure having a size ranging from about 1 to 100 μm and having carbon and a metal or a metallic oxide; and a plurality of line-shaped bodies whose diameters, i.e., sizes of cross-sections taken along lines perpendicular to the lengths of the line-shaped bodies, are smaller than about 200 nm, the line-shaped bodies having carbon as a main component thereof and growing from a surface (circumferential surface) of the structure. A second carbon substance in accordance with the present invention includes: one or more structures, each having a size ranging from about 1 to 100 μm and having carbon and a metal or a metallic oxide; and one or more line-shaped bodies whose diameters range from about 50 nm to about 1 μm, the line-shaped bodies having carbon as a main component thereof and growing from surfaces of the structures connecting at least two structures, and further the line-shaped bodies having a particle containing a metal or a metallic oxide (fine particle containing catalyst or catalyst oxide). A third carbon substance in accordance with the present invention includes: a structure having a size ranging from about 1 μm to about 100 μm and having carbon and a metal or a metallic oxide; and one or more line-shaped bodies whose diameters range from about 50 nm to about 1 μm, each line-shaped body having carbon as a main component thereof and having a loop shape by growing from a surface of the structure and returning to the same, and further each line-shaped body having a particle containing a metal or a metallic oxide.

Herein, the structure, formed as a base, has a curved shape of sphere, hemisphere, ellipse, half ellipse, or the like. The structure may be a single body, a body formed by joining more than two structures of a same shape (the structures may have equal or different sizes), or a body formed by joining more than two structures of different shapes (the structures may have equal or different sizes). The structure contains Ni (or its oxide) and In (or its oxide). And the structure may contain an alloy, alloy oxide or a mixture thereof. Mostly, the metals, the alloy or their oxides (metallic oxides, alloy oxide) are coated on a substance having carbon as a main component (carbon material). There is hardly any structure composed of only the metals or the like.

The line-shaped body is a fiber (fiber not having an orifice therein) or a tube (fiber having an orifice therein) of nanosize or microsize. Generally, more tubes exist than the fibers. Both the fiber and the tube are amorphous. They are not as crystallized as generally known nanotubes.

The line-shaped body of the first carbon substance includes a particle (particle having a catalyst metal or a catalyst metallic oxide) at a vertical hem thereof, wherein the particle contains a metal or a metallic oxide composed of Ni (or its oxide) and In (or its oxide), alloys, alloy oxides, or a mixture thereof.

The second carbon substance includes more than one line-shaped body whose diameter is smaller than 200 nm, the line-shaped body growing from a surface of the base structure which is not used to connect a plurality of structures, and further the line-shaped body having a particle containing a metal or a metallic oxide (particle containing a catalyst metal or a catalyst metallic oxide) at a vertical hem thereof. This line-shaped body is almost identical with that of the first carbon substance.

The second carbon substance also includes more than one line-shaped body whose diameter ranges from about 50 nm to about 1 μm, the line-shaped body having a loop shape that is originating from a surface of the structure and returns to the same, and further the line-shaped body having a particle containing a metal or a metallic oxide (particle containing a catalyst metal or a catalyst metallic oxide). The particle (catalyst particle) exists almost in the middle of the plurality of structures. In case the plurality of structures are joined together, the size can be up to about 5 mm.

The catalyst particle of the second carbon substance may include Ni (or its oxide) and In (or its oxide), alloys, alloy oxides, or a mixture thereof.

The third carbon substance includes more than one line-shaped body whose diameter ranges from about 50 nm to about 1 μm, the line-shaped body having a loop shape that originates from a surface of the structure and returns to the same, and further the line-shaped body having a particle containing a metal or a metallic oxide. The particle in the third carbon substance exists almost in the middle of the loop shape.

The particle includes Ni (or its oxide) and In (or its oxide), alloys, alloy oxides, or a mixture thereof.

A point on the surface of the structure where the line-shaped body having a loop shape ends up may be almost same with or different from that where the line-shaped body starts.

The third carbon substance includes more than one line-shaped body whose diameter is smaller than 200 nm, the line-shaped body originating from a surface of the structure, and further the line-shaped body having a particle containing a metal or a metallic oxide at a vertical hem thereof. This line-shaped body is almost identical with that of the first carbon substance.

As described above, since the carbon substances in accordance with the present invention have new structures, the characteristics will be described in comparison with the conventional nanocarbon (carbon fiber) as follows.

(1) As an Electron Emission Source

In case the carbon substance is sprinkled on a surface of a conductive paste, e.g., a silver paste, or laid under the surface under pressure, whatever direction the base structure is arranged in, a large number or protrusions may be directed along a direction perpendicular to the substrate (e.g., a direction in which electrodes for emission are arranged), so that an electric field can be easily applied to the line-shaped bodies (an electric field can be easily concentrated). Further, the line-shaped bodies are arranged to make acute angles and dispersed appropriately, and also have high aspect ratios. For that reason, an electric field electron emission is performed at a low voltage and the density of emitted electron is kept high. Consequently, the carbon substance is suitable for an electron emission element and an electron emission device using same.

(2) As a Filler of Composite Material

When the carbon substance is mixed with a matrix material, e.g., cement, synthetic resin, rubber, paper, urethane, elastomer, ceramics, concrete, and the like, the line-shaped body works as an anchor which makes it difficult to come out of the matrix. Further, owing to mechanical strength, elasticity, resilience, conductivity, surface smoothness of the fiber (line-shaped body), the composite material may show improved mechanical strength, impact resistance, and electric and thermal conductivity. Also, the composite material may be easy to work with in a coating process.

Since the carbon substance is a conductive nanomaterial, it can absorb electromagnetic waves as eddy currents. Further, since a joint fiber web, i.e., the second carbon substance of the present invention, has a loop-shaped fiber or forms a loop between sites, it can efficiently absorb electromagnetic waves. And this is the same for the third carbon substance.

(3) Other Uses

The novel carbon substance may be used as an electrode for primary cell (battery reaction is accelerated by making the electrode porous), an electrode or a mixing material in an electrode for secondary cell (high mechanical strength, elasticity, and resilience is expected), a catalyst carrier for fuel cell (cell reaction efficiency is improved), a material for gas storage device, a filter for gas or liquid purification device, a lubricant (the carbon substance has a lubricous surface), an abrasive for metal, ceramics, glass and the like (the carbon substance is a nanometer sized material of hard amorphous carbon).

As described above, the carbon substances of the present invention are of new structures and cannot be manufactured by any of the conventional methods. Accordingly, methods for manufacturing carbon substances in accordance with the present invention are new.

A method for manufacturing a carbon substance in accordance with the present invention uses a CVD method. Among the various CVD methods, a catalytic CVD, a vapor phase thermal decomposition, a thermal CVD, a hot filament CVD, and a plasma CVD, and others can be used. Further, the carbon substance manufacturing process features inclusion of a specific catalyst (Ni or its oxide and In or its oxide) and thermal decomposition within a specific temperature range (the first carbon substance: from about 675° C. to about 750° C.; the second carbon substance: from about 550° C. to about 700° C.)

The method for manufacturing a carbon substance will now be described in detail.

FIG. 1 schematically shows a device used in a method for manufacturing a carbon substance in accordance with a preferred embodiment of the present invention. The device is a basic type thermal CVD device classified into a substrate method.

As shown in FIG. 1, the device is comprised of a reaction furnace 1, a gas cylinder 2 to supply a source gas into the reaction furnace 1, a gas cylinder 3 to supply a specific gas (dilution gas) into the reaction furnace 1, a gas flow controller 4 for regular supply of the source gas and the specific gas, a substrate 6 carrying a catalyst 5, a heating device 7 to heat the react-on furnace 1 at least in the vicinity of the catalyst 5, and an exhaust device 8 to evacuate the reaction furnace 1.

The reaction furnace 1 is arranged inside the heating device 7. The reaction furnace 1 is maintained at a desired temperature by using the heating device 7. Also, the substrate 6 is arranged inside the reaction furnace 1. The substrate 6 is maintained at a desired temperature together with the reaction furnace 1 by using the heating device 7.

Using the above-described device, manufacturing of a carbon substance is executed through a following procedure.

① A substrate 6 on which a catalyst 5 is mounted is arranged inside a reaction furnace 1.

② The reaction furnace is heated to a desired temperature by using the heating device 7 while a specific gas is supplied into the reaction furnace 1. (heating process)

③ After being stabilized at the desired temperature, a source gas (a carbon-including gas) is supplied into the reaction furnace 1 for a certain time (preset reaction time) while the desired temperature is maintained. Under this condition, the source gas is decomposed, thereby growing a carbon substance on a surface of the catalyst 5. (reaction process)

④ After a preset time passed, the source gas supply is turned off. Also, the heating device 7 is turned off. Then, the reaction furnace 1 is cooled while the specific gas is supplied thereinto. (cooling process)

⑤ When the reaction furnace 1 is cooled enough, the substrate 6 having the carbon substance grown thereon is taken out of the reaction furnace 1.

The above procedure illustrates a method classified into the substrate method among the catalytic CVD method. Other than the substrate method, a fluidized bed method or a floating catalytic method (i.e., a floatation method) can be used. When the fluidized bed method is used, a catalyst substrate is conveyed sequentially, thereby synthesizing carbon substances successively. And in the floatation method, a catalyst is injected into one side of a reaction vessel, while a carbon substance is taken out to the other side. Usually, a catalyst is dropped from an upper side of the reaction vessel, the reaction vessel being arranged vertically. And the grown carbon substance is retrieved from a lower side of the reaction vessel.

To describe in detail, in the fluidized bed method or the floatation method, a carbon substance is manufactured through a following procedure.

① A reaction vessel is heated to a desired temperature while a specific gas (dilution gas) is supplied thereinto.

② A source gas is supplied into the reaction vessel while the desired temperature is maintained.

③ A powder or liquid type catalyst is injected into the reaction vessel while the desired temperature is maintained. A carbon substance is obtained at an outlet of the reaction vessel.

As described above, various kinds of CVD methods can be used. In a hot filament CVD method, a gas can be easily decomposed, and therefore a carbon substance can be obtained even if the heating device 7 is set at a low temperature. Further, it is also desirable to generate plasma in the reaction furnace 1.

Although a quartz glass is usually used as a material for the reaction furnace 1, a ceramics can be used instead. Generally, a quartz glass can be easily obtained and is cheap when used for a large diameter reaction furnace 1.

For the first carbon substance, a temperature of the reaction furnace 1 is required to range from about 675° C. to about 750° C., preferably from about 675° C. to about 725° C. For the second carbon substance, the temperature should range from about 550° C. to about 700° C., preferably from about 600° C. to about 650° C.

A pressure inside the reaction furnace is not specifically prescribed. A pressure ranging from about $1 \times 10^{-1}$ Pa to about 200 KPa is desirable. 100 Kpa (about atmospheric pressure) is the most desirable.

A source gas reserved in the gas cylinder 2 may be a hydrocarbon gas such as $CH_2$, $C_2H_2$, $C_2H_4$, $C_6H_6$, $CH_4$, $CH_3(OH)$, $C_2H_5(OH)$, or the like. And CO or $CO_2$ can be used as well. Further, an organic solvent including carbon such as toluene or xylene may be vaporized and introduced into the reaction furnace. Furthermore, an alcohol vapor may be used as well. Out of these, organic solvents such as $C_2H_2$, CO, toluene and xylene may be used efficiently since they are decomposed at low temperatures. When $C_2H_4$ is used, it is advisable to apply a hot filament CVD method (Japanese Patent Laid-open Publication No. 2001-240403) since it is difficult to decompose the material.

A specific gas reserved in the gas cylinder 3 may be a noble gas (inert gas) such as He, Ne, Ar, or the like. And $H_2$ or $N_2$ can be used. Further, a fluorinated gas or a chlorinated gas may be used as well. Among these, He and Ar are efficient in synthesizing carbon substances owing to a low reactivity. In view of the thermal capacity, Ar is preferable to He. A small amount of fluorinated gas or chlorinated gas is suitable for performing a chemical modification on carbon substances.

The gas flow controller 4 may be a gas flowmeter or a mass flow controller commercially available.

The catalyst 5 includes at least one material out of Ni and its oxides, e.g., NiO, and at least one material out of In and its oxides, e.g., $In_2O_3$. The catalyst 5 is mounted on the substrate 6 as a powder (mixed powder) or coated on the substrate 6 after being melted (dispersed) into a liquid. The catalyst 5 can be coated on the substrate 6 as one mixture layer or as two separate layers (the order of layering is not prescribed) by a thin film forming method such as an electron beam deposition or vacuum arc deposition.

Although an electric furnace is usually used as the heating device 7, heaters using high temperature vapor or infrared lays are also available. By using an electric furnace, costs can be cut down. When waste heat is available from a boiler, a heater using high temperature vapor is practical. A heater using infrared rays has an advantage of raising temperature instantaneously.

As the substrate 6 carrying the catalyst 5, materials which stands against heat of 1000° C., e.g. silicon, heatresisting glass, ceramics, carbon material (e.g., graphite), metal, and the like can be used.

The exhaust device 8 may be a simple bubbler. A backward flow of the atmosphere is prevented by passing an exhaust gas through the bubbler. Further, an exhaust pump may be used. When an exhaust pump or a vacuum pump is used, a good exhaustion can be performed and pressure in the reaction furnace 1 can be controlled as well.

Figure 2A:
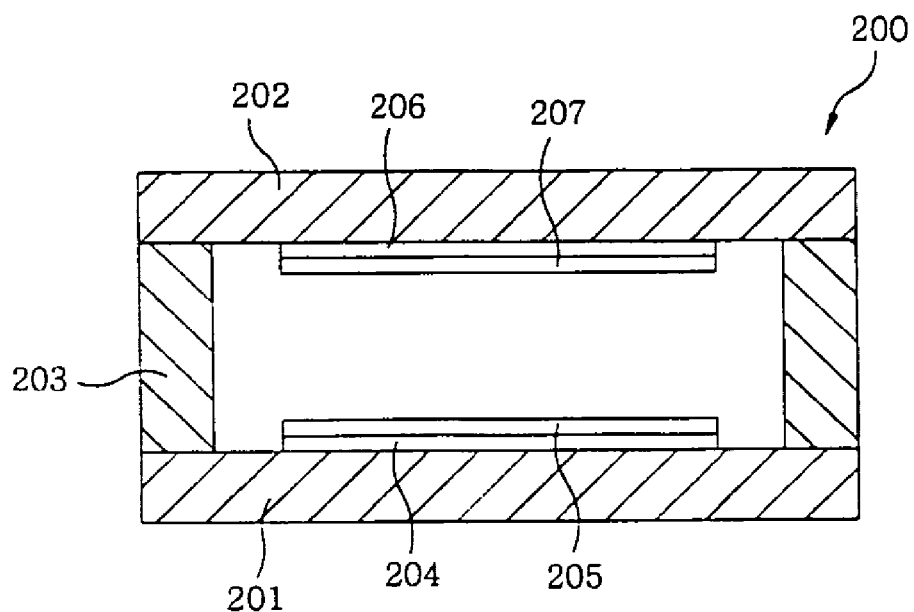
FIGS. 2A to 2B are cross-sectional views of an electron emission device using an electron emission element in accordance with preferred embodiments of the present invention.

FIG. 2A is a cross-sectional view of an electron emission device using an electron emission element in accordance with preferred embodiments of the present invention. The electron emission element uses a carbon substance obtained by using a manufacturing method of the present invention as an electron emission material.

As shown in FIG. 2A, a vacuum vessel 200 is composed of a glass substrate 201 (substrate), a glass substrate 202 (sealing member), and a side plate 203 (sealing member) which seals up a space between the glass substrates 201 and 202.

A cathode electrode 204 as a first electrode is formed on the glass substrate 201 by deposition of metal such as aluminum. A layer of electron emission material 205 is formed by coating the cathode electrode 204 with a paste including the carbon substance. On the glass substrate 202 facing the glass substrate 201, an anode electrode 206 as a second electrode is formed facing the electron emission material 205 by deposition of metal such as aluminum. A fluorescent material layer 207 such as ZnO:Zn is formed on the anode electrode 206 by a screen printing method.

In the above diode structured electron emission device, an electron is emitted from the carbon substance attached to the cathode electrode 204 when a voltage is applied between the cathode electrode 204 and the anode electrode 206. The emitted electron is attracted toward the anode electrode 206 so that it impinges on the fluorescent material layer 207. Accordingly, a light is emitted. Since the carbon substance has line-shaped bodies (carbon fiber) on its surface, an electron emission is performed efficiently even at a low voltage.

Figure 2B:
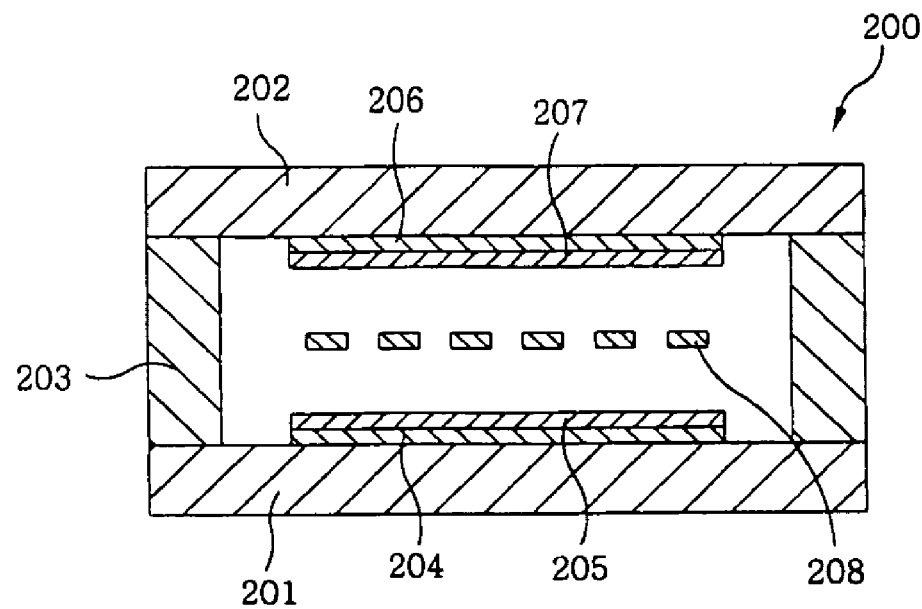

FIG. 2B is a cross-sectional view of another electron emission device using an electron emission element in accordance with preferred embodiments of the present invention. Identical reference numbers are given to members identical with those in FIG. 2A and description thereof will be omitted. Unlike the device in FIG. 2A, a grid electrode 208 of a metal mesh is formed as a third electrode on the glass substrate 201 facing the electron emission material 205.

In the above triode structured electron emission device, an electron is emitted from the carbon substance attached to the cathode electrode 204 when a voltage is applied between the cathode electrode 204 and the grid electrode 208. At the same time, a desired voltage is applied to the anode electrode 206. Then, the emitted electron is attracted toward the anode electrode 206 so that it impinges on the fluorescent material layer 207. Consequently, a light is emitted. Since the carbon substance has line-shaped bodies (carbon fiber) on its surface, an electron emission is performed efficiently even at a low voltage.

The present invention will now be described in more detail with reference to experimental examples. The present invention is not limited to following examples and various changes and modifications may be made.

A first example of the present invention used the device in FIG. 1. A quartz tube of a 45 mm diameter and 500 mm length was used as the reaction furnace 1. An electric furnace of a 300 mm length (effective heating length 200 mm) was used as the heating device 7. A bubbler was used as the exhaust device 8. A heatresisting glass substrate of a 72 mm length (in a length direction of the reaction furnace 1) and 26 mm width was used as the catalyst substrate 6.

A catalyst fine particle made by mixing NiO powder and $In_2O_3$ powder that was commercially available was used as the catalyst 5. A NiO powder particle diameter was about 1 µm; $In_2O_3$ powder particle diameter was about 1 µm; and mixing ratio {weight ratio (weight percentage: wt %)} of the two powders was 1 to 1 (50%:50%).

2 g of mixture catalyst 5 was put in a vial. And the mixture was blended for 5 minutes by using a medicine spoon so that an inclination would not be seen at least with the naked eye. Then the mixture was blended for 10 minutes by using a mill (the vial was turned on a shaft after being laid on a side). 10 mg of the catalyst 5 was spread on the glass substrate by 20 mm×50 mm so that one particle was not laid over another as long as possible (a thickness of the catalyst 5 was about 1 mm at thickest).

The substrate 6 was arranged in the middle of the electric furnace.

While a desired temperature was maintained by the electric furnace, the temperature was indicated by a temperature controlling thermocouple, i.e., a temperature sensor arranged outside the quartz tube in the middle of the electric furnace. When the desired temperature was 700° C., a temperature inside the quartz tube was from 700° C. to 730° C. (Only He was flowing).

Conditions for the first example were as follows.

① The heatresisting glass substrate on which the catalyst fine particle was mounted was arranged inside the quartz tube.

② At the heating process, He was used as a specific gas at a flow rate of 420 ml/min. Pressure inside the quartz tube was approximately atmospheric pressure (about 100 Kpa). The desired temperature of the electric furnace was 700° C. The heating process time to reach 700° C. from room temperature was 60 minutes. If a furnace using infrared rays was used, the heating process time could be shortened.

③ At the reaction process, He was used as a specific gas (dilution gas) at a flow rate of 420 ml/min. $C_2H_2$ was used as a source gas at a flow rate of 180 ml/min. Pressure inside the quartz tube was approximately atmospheric pressure. The desired temperature (reaction temperature) was maintained at 700° C. by the electric furnace. Thermal decomposition of the source gas was performed with the reaction time of 3 minutes after the source gas was introduced.

④ At the cooling process, the electric furnace was turned off, He gas being flowed as a specific gas at a flow rate of 420 ml/min. The electric furnace was cooled, maintaining this condition for 60 minutes.

⑤ When the electric furnace was cooler below 80° C., the heatresisting glass substrate having the carbon substance grown thereon was taken out of the quartz tube.

The carbon substance obtained from the first example will now be described referring to FIGS. 3 to 7.

Figure 3:
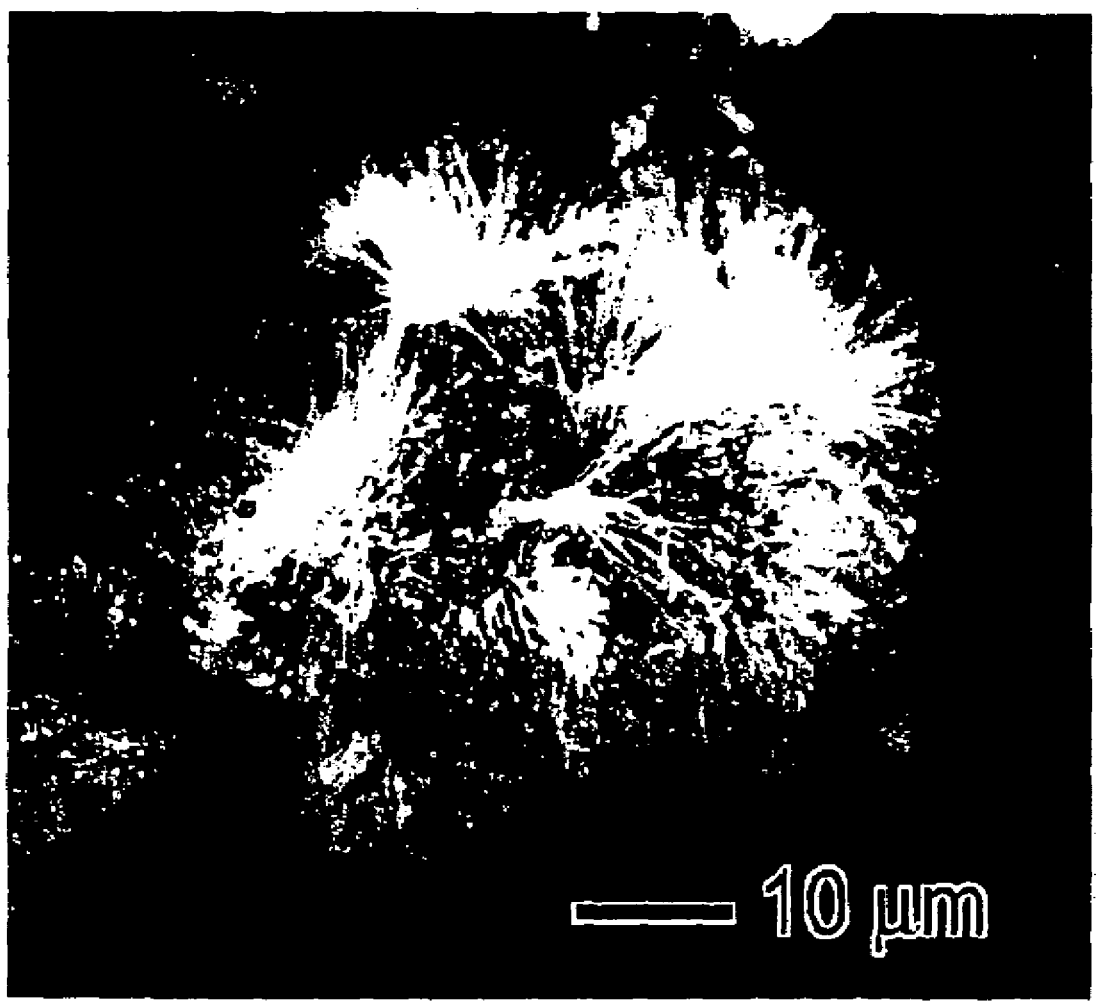
FIG. 3 is a SEM photograph showing a first carbon substance manufactured by employing a method for manufacturing a carbon substance in accordance with a first embodiment of the present invention.
Figure 4:
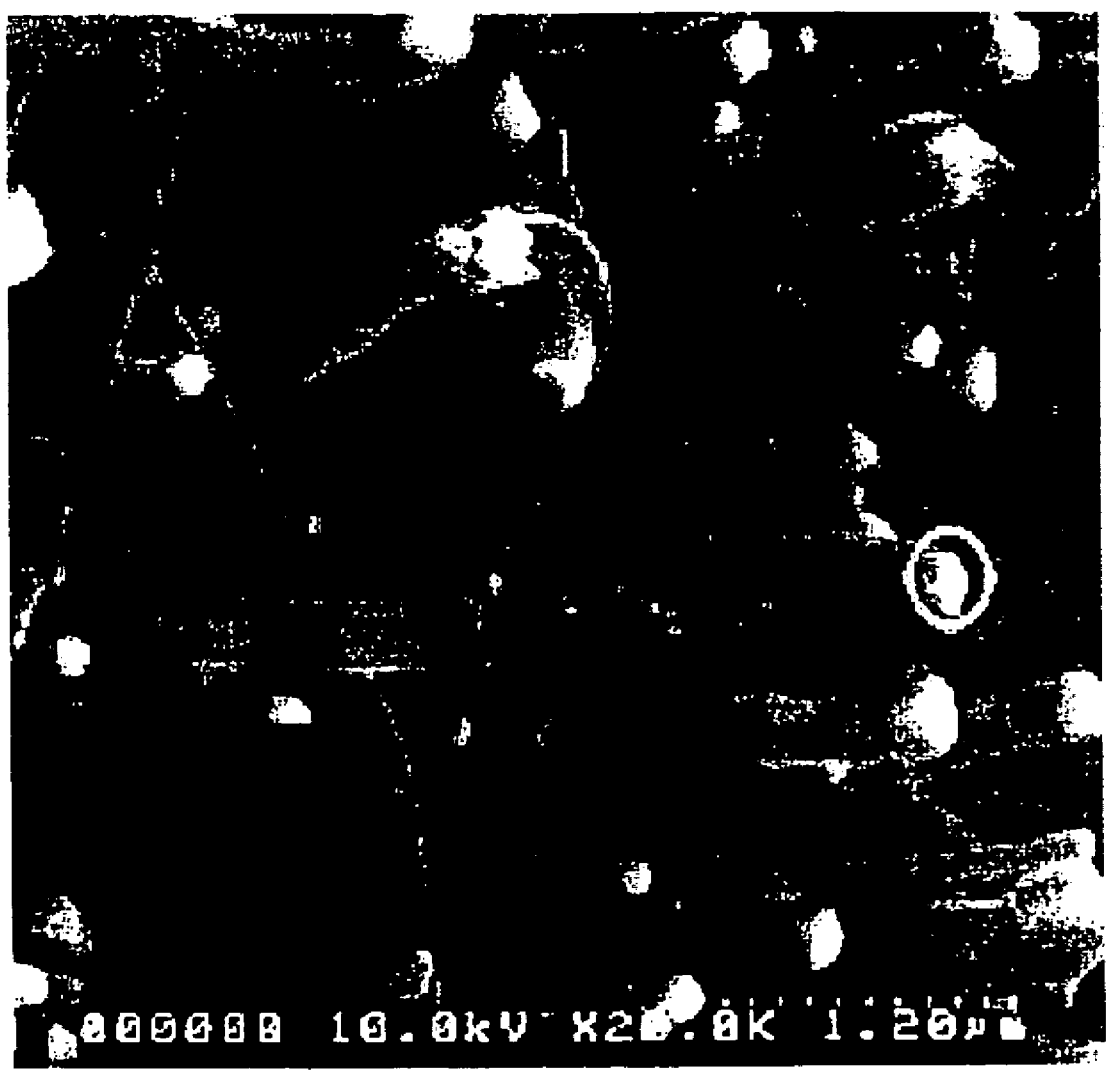
FIG. 4 is a SEM photograph showing the first carbon substance manufactured by employing the method for manufacturing a carbon substance in accordance with the first embodiment of the present invention.
Figure 5:
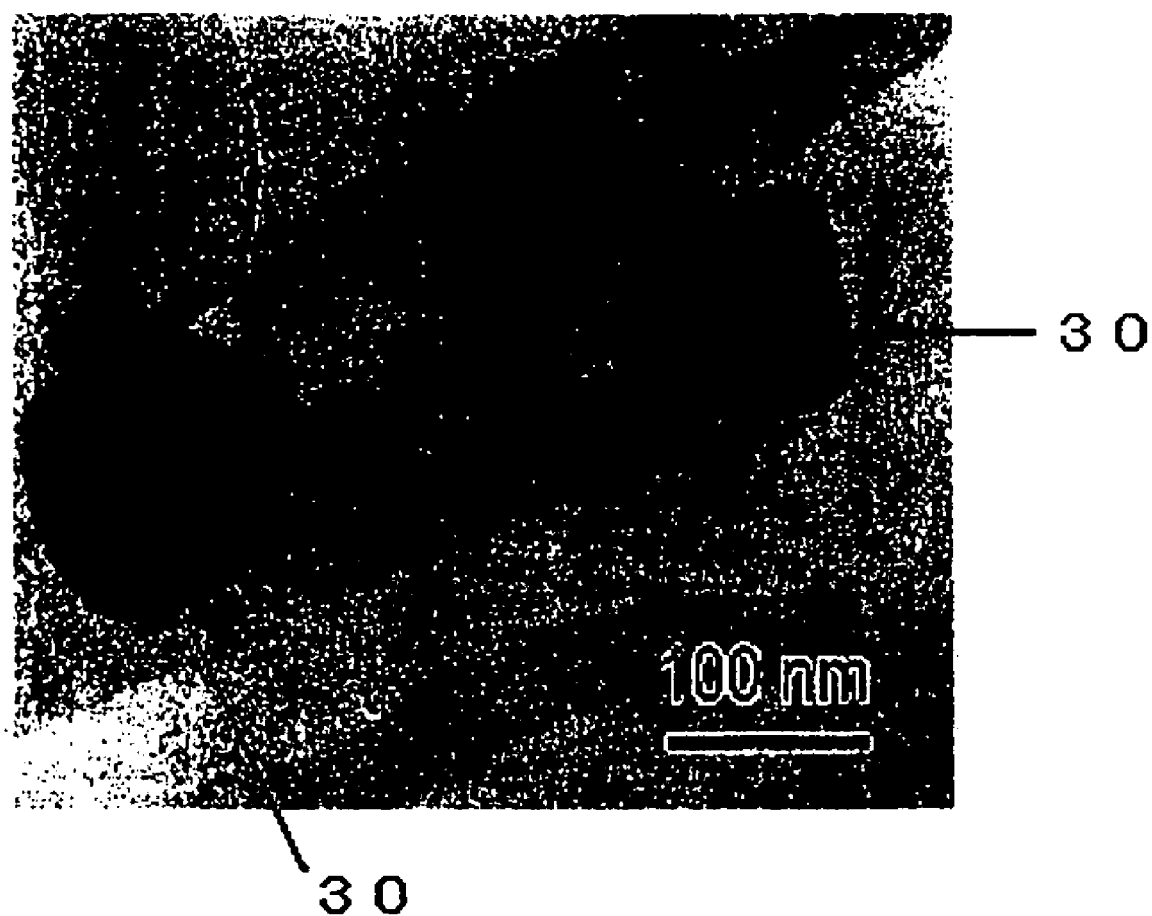
FIG. 5 is a TEM photograph showing the first carbon substance manufactured by employing the method for manufacturing a carbon substance in accordance with the first embodiment of the present invention.
Figure 6:
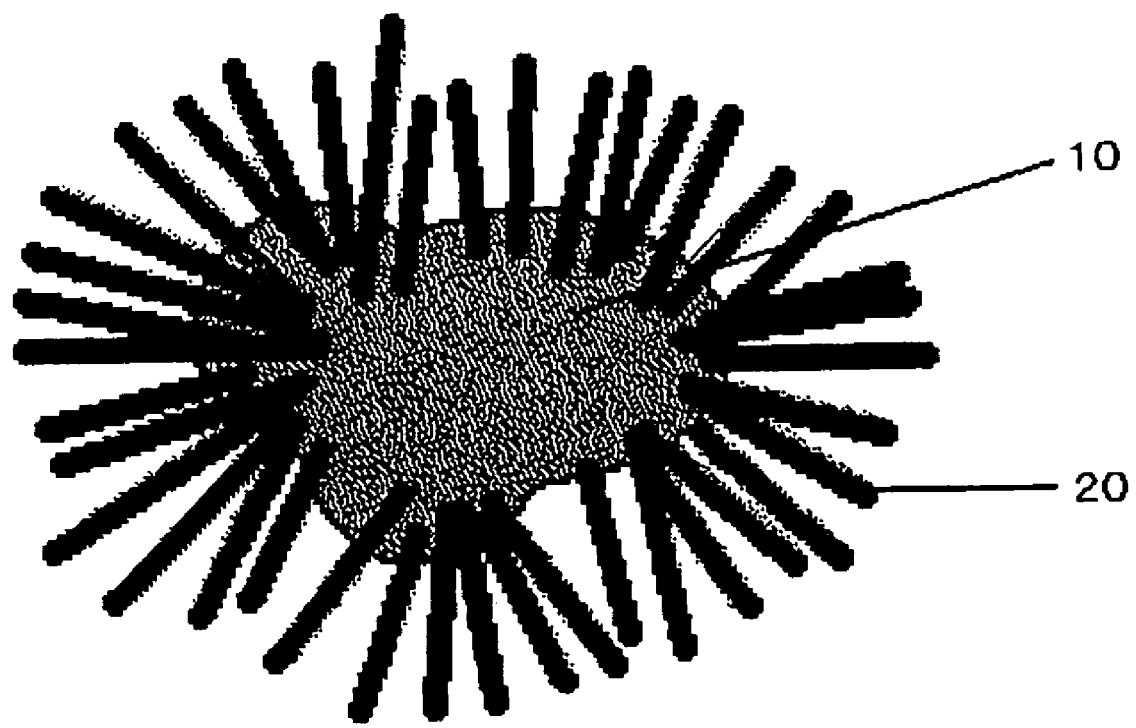
FIG. 6 schematically shows a structure of the first carbon substance in accordance with the first embodiment of the present invention.

FIGS. 3 to 5 show the carbon substance (first carbon substance of the present invention) manufactured by employing the method for manufacturing a carbon substance in accordance with a first example of the present invention. These drawings are photographs of the carbon substance formed on the substrate. FIG. 3 shows a high resolution SEM (scanning electron microscope) photo of the lowest magnification; and FIG. 4 shows a SEM photo of higher magnification. FIG. 5 is a TEM (transmission electron microscope) photo showing the vicinity of the round in FIG. 4. FIG. 6 illustrates a schematic structure of the carbon substance in FIG. 3. In behalf of understanding, lines and reference numerals are given in FIG. 5. And a round is shown in FIG. 4.

As shown in FIGS. 3 to 6, the carbon substance (nanotube bur-shaped particle) includes a base structure 10 having a size of about 1 μm to about 100 μm and a plurality of line-shaped bodies 20 growing from a surface of the structure 10, having diameters smaller than about 200 nm (mostly from about 20 nm to about 150 nm). A majority of the line-shaped bodies 20 has a diameter ranging from about 0.5 μm to about 30 μm. Further, a catalyst particle 30 exists at a vertical hem of the line-shaped body 20. And the catalyst particle 30 has a shape of circular cone or polygonal pyramid.

Figure 7:
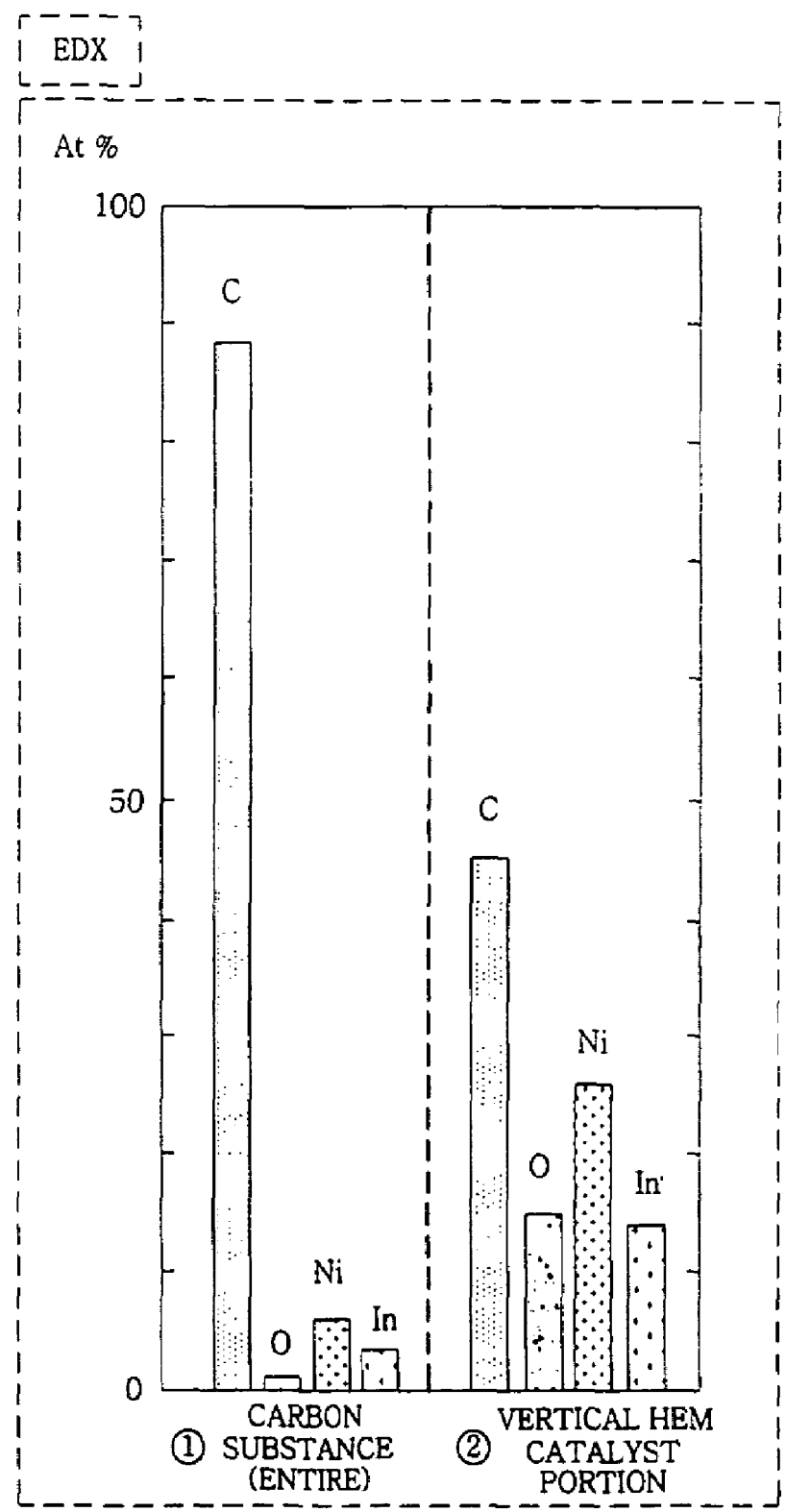
FIG. 7 illustrates an analysis of components of the first carbon substance in accordance with the first embodiment of the present invention.

FIG. 7 is an EDX (energy dispersive X-ray) analysis of the entire carbon substance shown in FIGS. 3 to 6 and its vertical hem catalyst portion. As shown in FIG. 7, the whole carbon substance including the base structure 10 has carbon as a main component. The base structure 10 includes alloys of Ni and In, their mixture, or their oxides. The structure 10 further includes carbon.

The line-shaped body 20 growing on the surface of the structure 10 has carbon as a main component. From the TEM photo in FIG. 5, it is known that the line-shaped body 20 is an amorphous carbon tube (fiber).

A yield of the first carbon substance in the first example was as follows.

(a) From the SEM result, a percentage yield of the reaction, i.e., a ratio of the first carbon substance to the whole substances manufactured, was about 40% at a maximum (the rest of the manufactured substances was undergrown particle, that is, nanotubes did not grow).

(b) A yield of the first carbon substance to the source gas, i.e., a ratio of the first carbon substance to the total carbon supply amount (amount of carbon out of the source gas), was about 0.9 wt % at a maximum.

(c) A yield of the whole carbon substances to the source gas, i.e., a ratio of the whole carbon substances manufactured to the total carbon supply amount, was about 2.25 wt %.

A second example of the present invention will now be described.

In the second example, the source gas was decomposed by using the device in FIG. 1, maintaining a temperature at a desired temperature of 600° C. Conditions other than the desired heating temperature were identical with those of the first example. In the second example, a low rate of the source gas was preferred to be smaller than 250 ml/min.

A carbon substance of the second example will be described referring to FIGS. 8 to 12.

Figure 8:
FIG. 8 is a SEM photograph showing a second carbon substance manufactured by employing a method for manufacturing a carbon substance in accordance with a second embodiment of the present invention.
Figure 9:
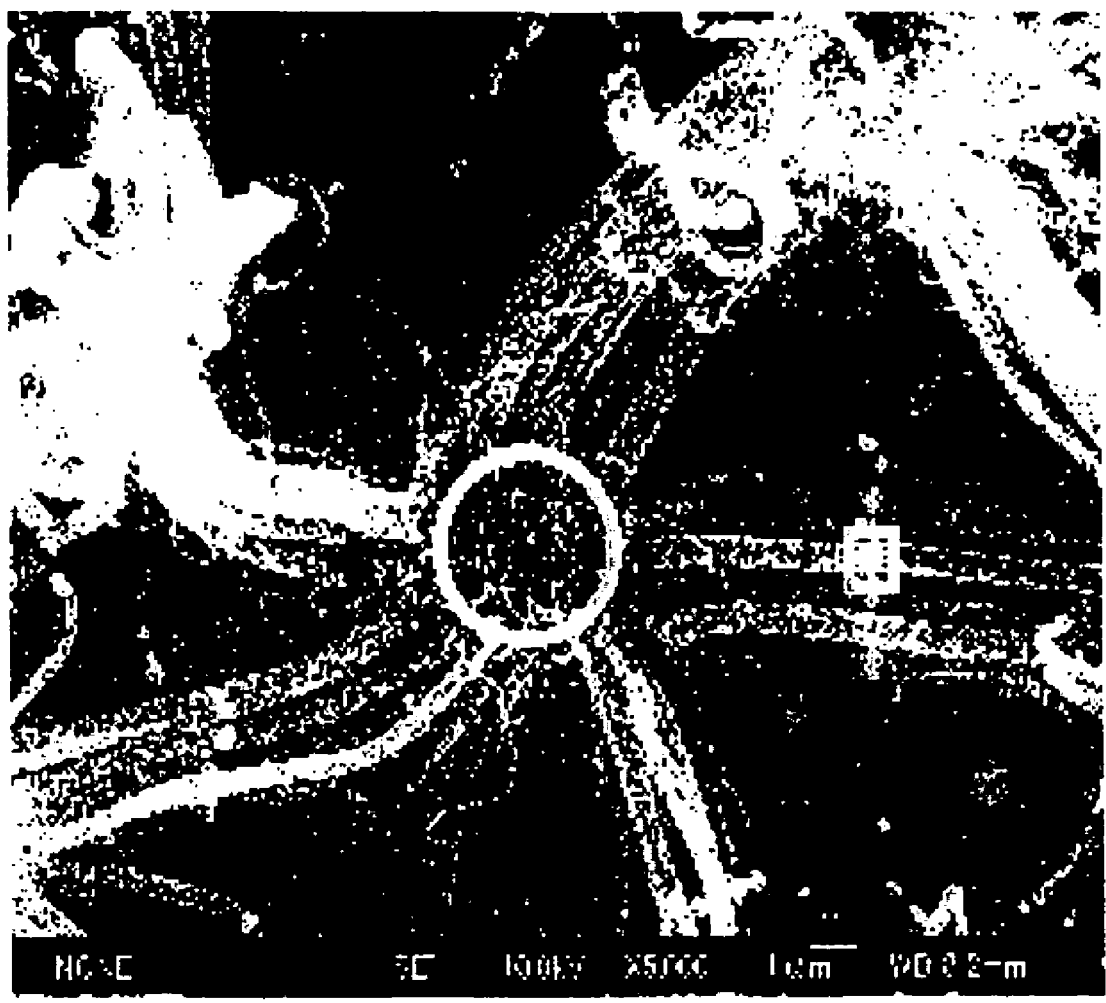
FIG. 9 is a SEM photograph showing the second carbon substance manufactured by employing the method for manufacturing a carbon substance in accordance with the second embodiment of the present invention.
Figure 10:
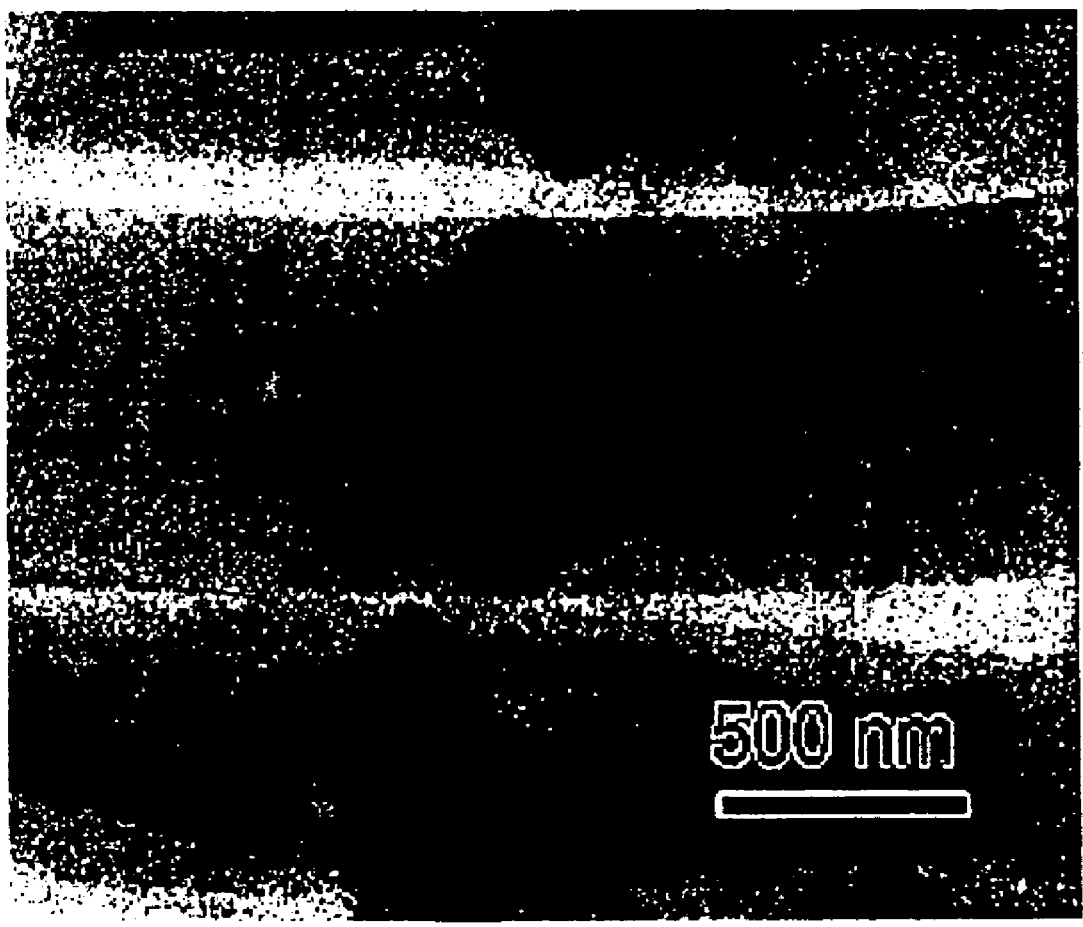
FIG. 10 is a TEM photograph showing the second carbon substance manufactured by employing the method for manufacturing a carbon substance in accordance with the second embodiment of the present invention.
Figure 11:
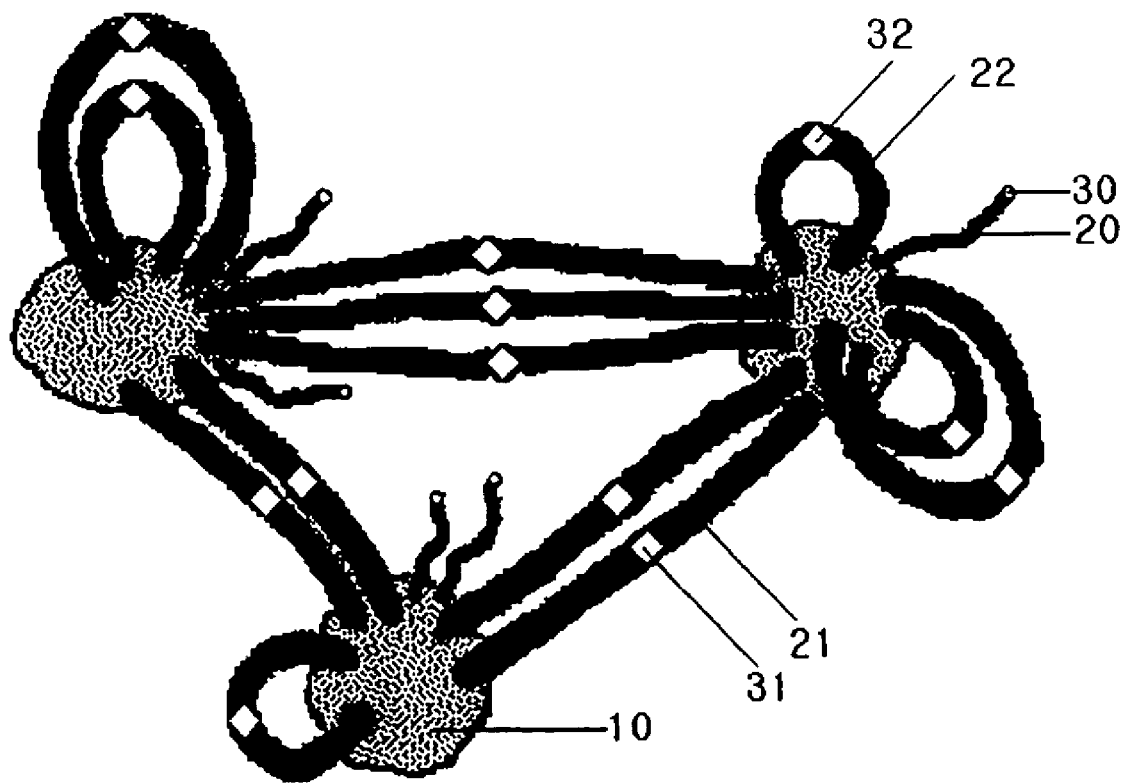
FIG. 11 schematically shows a structure of the second carbon substance in accordance with the second embodiment of the present invention.

FIGS. 8 to 10 show the carbon substance of the second example. These drawings are photographs of the carbon substance formed on the substrate. FIG. 8 is a SEM photo of the lowest magnification. FIG. 9 is a SEM photo of higher magnification showing the structure portion which works as a base. FIG. 10 is a TEM photo showing the vicinity of the square in FIG. 9. FIG. 11 illustrates a schematic structure of the carbon substance in FIG. 8.

As shown in FIGS. 8 to 11, the carbon substance (joint fiber web) included one or more case structures 10 of a diameter ranging from about 1 to 100 μm and a line-shaped body whose diameter ranged from about 50 nm to about 1 μm, the line-shaped body growing from the surface of the structure 10 connecting plural structures 10, and further the line-shaped body having a catalyst particle 31. The structure 10 of the second carbon substance showed a tendency to be smaller than that of the first carbon substance.

Site cores were the structures 10 which were birthplaces of the line-shaped bodies 21. And a distance between the site cores ranged from about 5 μm to about 20 μm. The site cores were joined together with a joint fiber which was a relatively thick line-shaped body 21. A thickness of the joint fiber was from about 50 nm to about 1 μm, mostly being from about 200 nm to about 300 nm. A large number of joint fibers had an orifice (an inner diameter ranging from about 5 nm to about 50 nm) therein. Some of the joint fibers were twisted. There might be joint fibers which were not connected to site cores, but they were few. The joint fiber was a line-shaped body having a joint of the catalyst 31. The joint catalyst was at one position of a joint fiber. A joint catalyst was positioned almost in the middle of two site cores. In other words, distances from a joint catalyst to two different site cores were approximately same. In joint fibers, there were one which connected two different sites and one which returned to a site from which it started (about 5 to 20%).

The joint fiber which returned to a site from which it started (loop fiber) was a line-shaped body 22 whose diameter ranged from about 50 nm to about 1 μm, the line-shaped body having a loop shape originating from a surface of the structure 10 and returning to the same, and further the line-shaped body having a catalyst particle 32 therein. When sites were not joined together, all joint fibers returned to a site from which it started.

In line-shaped bodies, other than a joint fiber and a loop fiber, there was a jointless fiber (Although it started from a site core, it neither connected site cores nor returned to the site core from which it started). One or more jointless fibers originated from a surface of the structure 10. And they were thinner than the other line-shaped bodies 21 and 22, having diameters smaller than 200 nm, mostly ranging from about 20 nm to about 150 nm. This line-shaped body 20 was identical with that of the first example. A large number of jointless fibers had an orifice (an inner diameter ranging from about 2 nm to about 20 nm) therein. In the type of jointless fibers, there were one which originated from its vertical hem (the catalyst existed only at the vertical hem) and one which had plural catalyst joints (the catalyst existed at its vertical hem, too). The latter type of jointless fibers was twisted.

The majority of the joint fibers were of length ranging from about 5 to about 30 μm long. The majority of the jointless fibers were of length ranging from about 0.5 to about 30 μm long. All these line-shaped bodies 20, 21 and 22 were amorphous carbon fibers.

Further, the second carbon substances were obtained as pieces (flake particles) on the whole.

A catalyst was located: in the middle (a joint) of the joint fiber; at a vertical hem and joints of the jointless fiber; and at the site core. A catalyst located at the joint fiber had a shape of a combination of two circular cones or polygonal pyramids. And it looked like a shape of rhomboid in two dimensions. The catalyst of the joint fiber was of a length ranging from about 50 nm to about 1 μm long (Approximately same with the fiber diameter). Among catalysts located at the jointless fiber, a vertical hem catalyst was of a shape of circular cone or polygonal pyramid. The catalysts 30, 31 and 32 were considered to include Ni (or its oxide) and In (or its oxide), alloys, alloy oxides, or a mixture thereof.

As can be seen from the TEM photo in FIG. 10, since the catalyst was taken as a square, the joint catalyst 31 located at the joint fiber was considered to be a shape of a combination of two circular cones (or two polygonal pyramids). The vertical hem catalysts 30 of the jointless fiber and the bur-shaped nanofiber (line-shaped body of the first carbon substance) were a circular cone or a polygonal pyramid.

Figure 12:
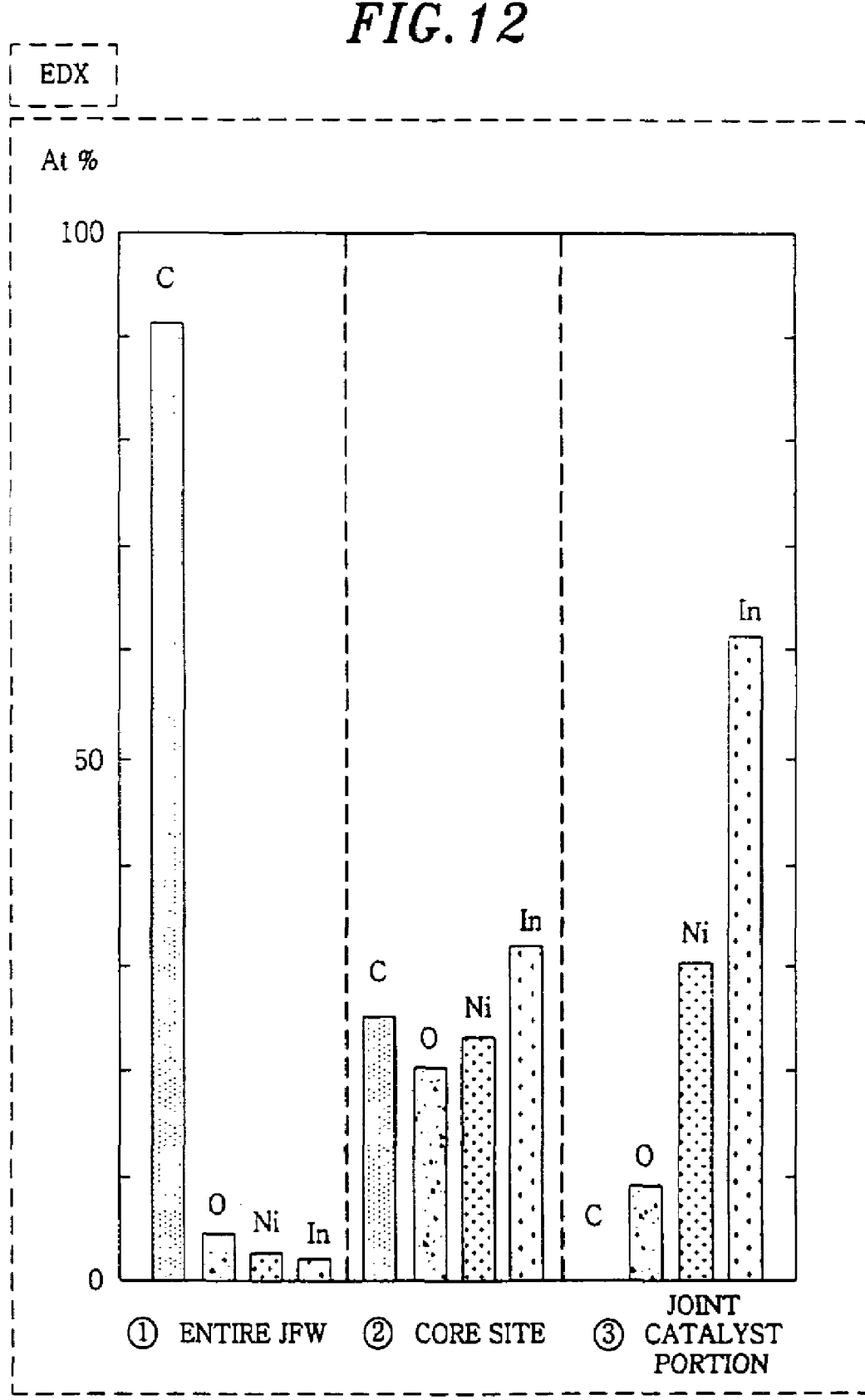
FIG. 12 illustrates an analysis of components of the second carbon substance in accordance with the second embodiment of the present invention.

FIG. 12 shows EDX analyses of the entire carbon substance in FIGS. 8 to 11, the structure 10 (the round in FIG. 9) and the catalyst portion at the line-shaped body 31 (the square in FIG. 9). As shown in FIG. 12, the base structure 10 included carbon, metals, or metallic oxides. It appears that the base structure 10 included Ni and In and that they (Ni and In) were oxidized. The line-shaped body 31 originating from the surface of the structure 10 included carbon as a main component. And it was the same with the line-shaped bodies 30 and 32.

A yield of the second carbon substance in the second example was as follows.

(a) From the SEM result, a percentage yield of the reaction, i.e., a ratio of the second carbon substance to the whole substances manufactured, was larger than 90%.

(b) A yield of the second carbon substance to the source gas, i.e., a ratio of the second carbon substance to the total carbon supply amount (amount of carbon out of the source gas), was about 30 wt % at a maximum.

(c) A yield of the whole carbon substances to the source gas, i.e., a ratio of the whole carbon substances manufactured to the total carbon supply amount, was about 33 wt %.

When the second carbon substance of the second example was heated at an atmosphere devoid of oxygen, the amorphous material was crystallized to graphite. Therefore, it is available for manufacture or a carbon nanotube or a carbon nanofiber.

A third example of the present invention will now be described.

In the third example, a mixture powder of Ni and In was used as the catalyst 5 and the device in FIG. 1 was employed. Conditions other than the catalyst were identical with those of the first example.

Figure 13:
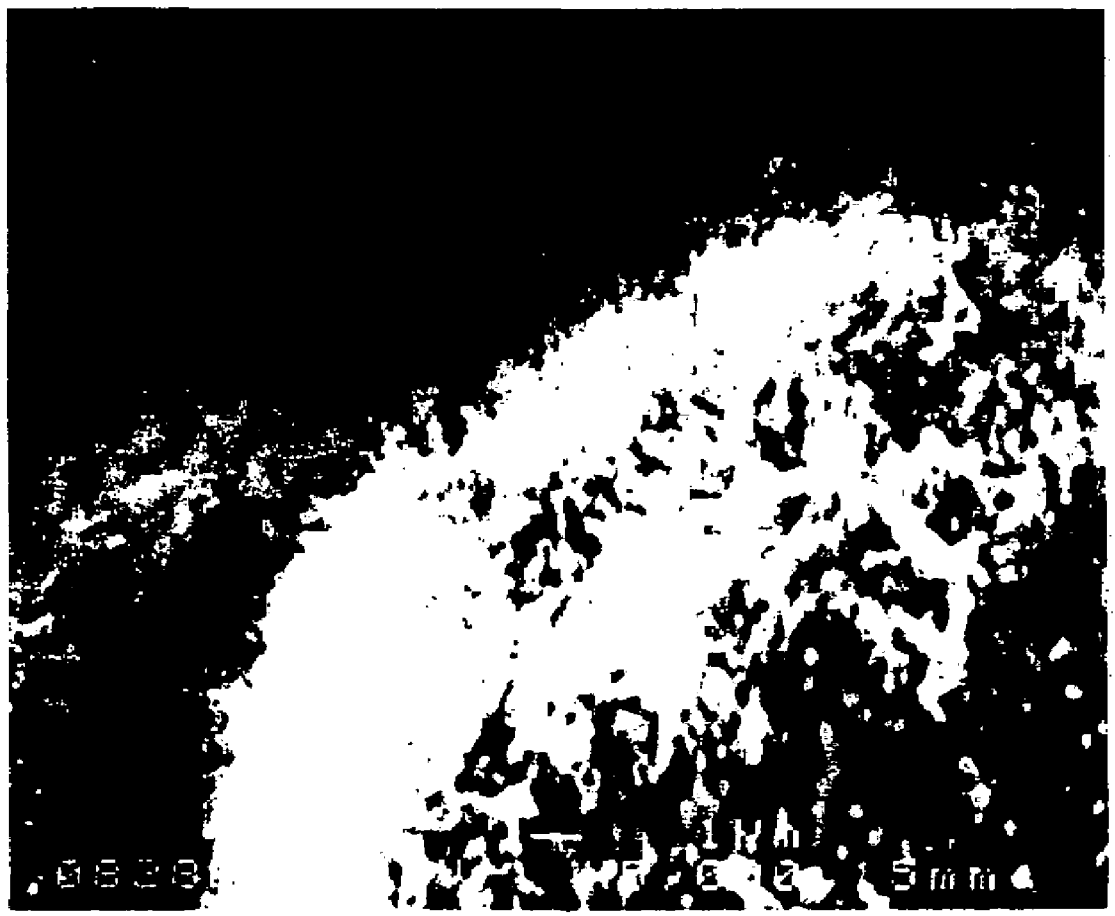
FIG. 13 is a SEM photograph showing a carbon substance manufactured by employing a method for manufacturing a carbon substance in accordance with a third embodiment of the present invention.

FIG. 13 shows a carbon substance of the third example. It is a SEM photo of the carbon substance grown on a substrate. From FIG. 13, it can be seen that the carbon substance was almost identical with that of the first example. Compared with the carbon substance of the first example, only line-shaped bodies growing on a surface of a structure were shorter than those of the first example.

A fourth example of the present invention will now be described.

In the fourth example, $Fe_2O_3$ was added to the catalyst 5, with a nixing ratio (Ni:In:$Fe_2O_3$ wt %) 1:1:1, and the device in FIG. 1 was employed. Conditions other than the catalyst were identical with those of the second example.

Figure 14:
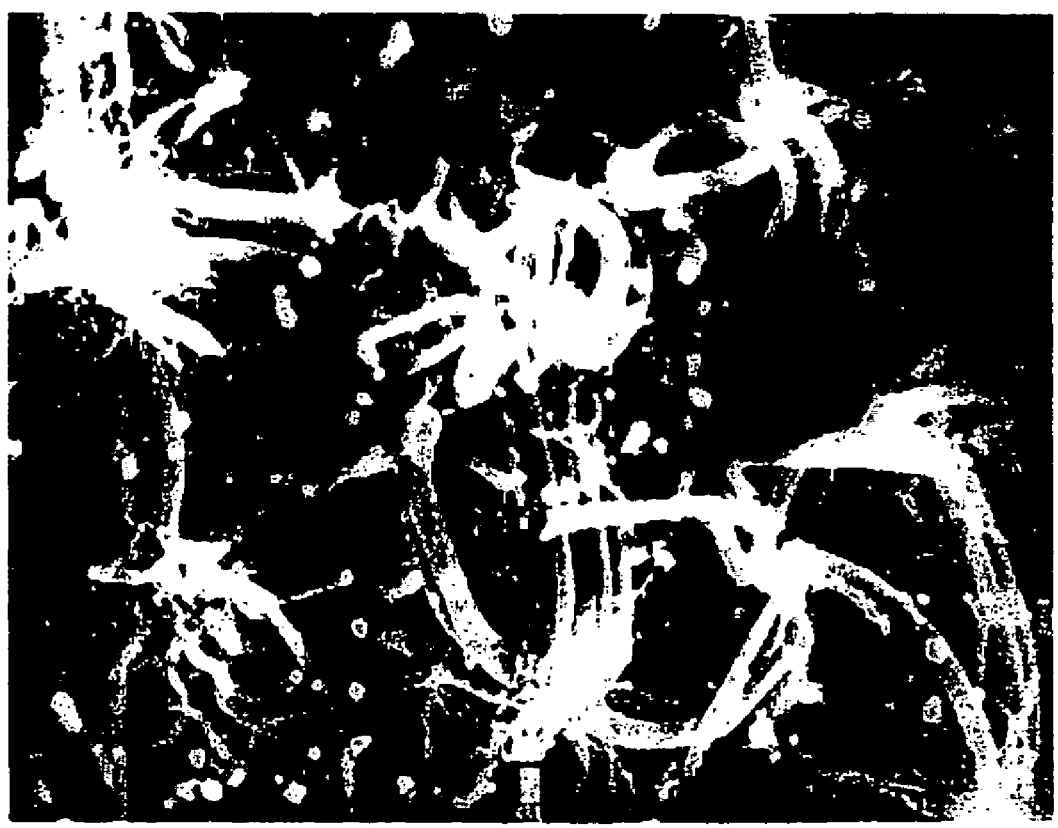
FIG. 14 is a SEM photograph showing a carbon substance manufactured by employing a method for manufacturing a carbon substance in accordance with a fourth embodiment of the present invention.

FIG. 14 shows a carbon substance of the fourth example. It is a SEM photo of the carbon substance grown on a substrate. From FIG. 14, it can be seen that the carbon substance was almost identical with that of the second example.

Referring to FIGS. 5 to 9, experiment results will be described, which was performed to specify conditions for synthesizing the first and the second carbon substances. In following examples, NiO and $In_2O_3$ were used as a catalyst. However, other catalysts compound could be used as well.

(1) Catalyst Mixing Ratio

In the fifth example, the device in FIG. 1 was employed. But, a catalyst mixing ratio (wt %) was varied. Conditions other than the catalyst mixing ratio were identical with those of the first example.

Figure 15A:
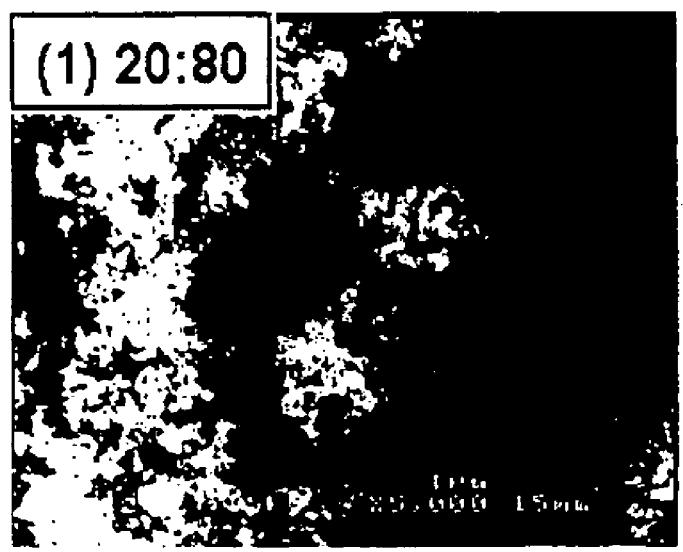
FIGS. 15A to 15D are SEM photographs showing a carbon substance manufactured by employing a method for manufacturing a carbon substance in accordance with a fifth embodiment of the present invention.

FIG. 15A is a SEM photo of a carbon substance formed on a substrate in case the mixing ratio (wt %) of NiO and $In_2O_3$ was 2 to 8. The mixing ratios were: 4 to 6 in FIG. 15B; 6 to 4 in FIG. 15C; and 8 to 2 in FIG. 15D, respectively.

Figure 15B:
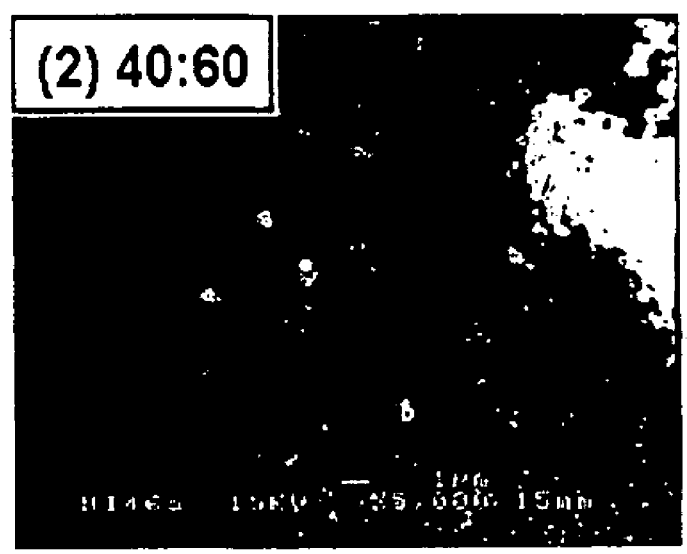
Figure 15C:
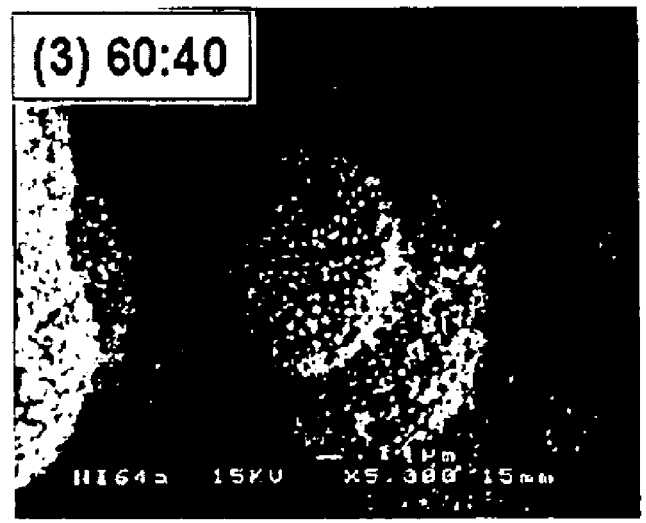
Figure 15D:
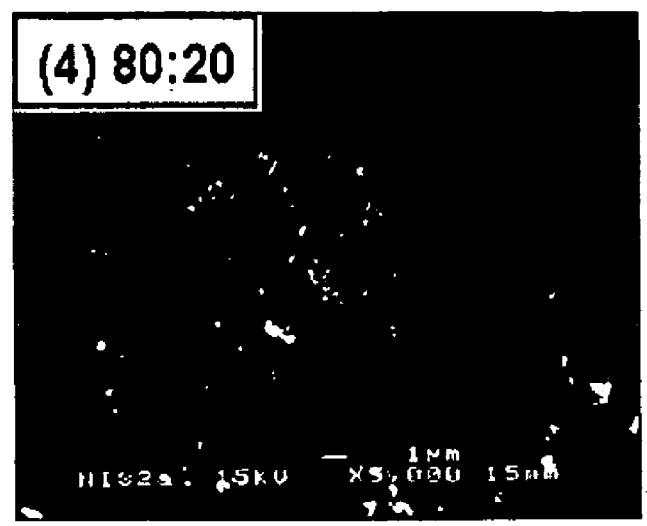

As shown in FIG. 15A, in case the mixing ratio was 2 to 8, a carbon substance showed a coralline shape. As shown in FIG. 15B, in case the mixing ratio was 4 to 6, a carbon substance was a nanotube bur-shaped particle which was the first carbon substance. As shown in FIG. 15C, in case the mixing ratio was 6 to 4, a carbon substance was a nanotube bur-shaped particle (However, line-shaped bodies had a tendency to be shorter than those in FIG. 15B). As shown in FIG. 15D, in case the mixing ratio was 8 to 2, although catalysts were forming fine particles, deposition of carbon was not very large.

From FIGS. 15A to 15D, it is known that, under same manufacturing conditions, a nanotube bur-shaped particle grows in case the mixing ratio is from about 4:6 to about 6:4.

(2) Reaction Temperature

In the sixth example, the device in FIG. 1 was employed. But, a reaction temperature was varied from 300° C. to 800° C. Conditions other than the reaction temperature were identical with those of the first example.

Figure 16:
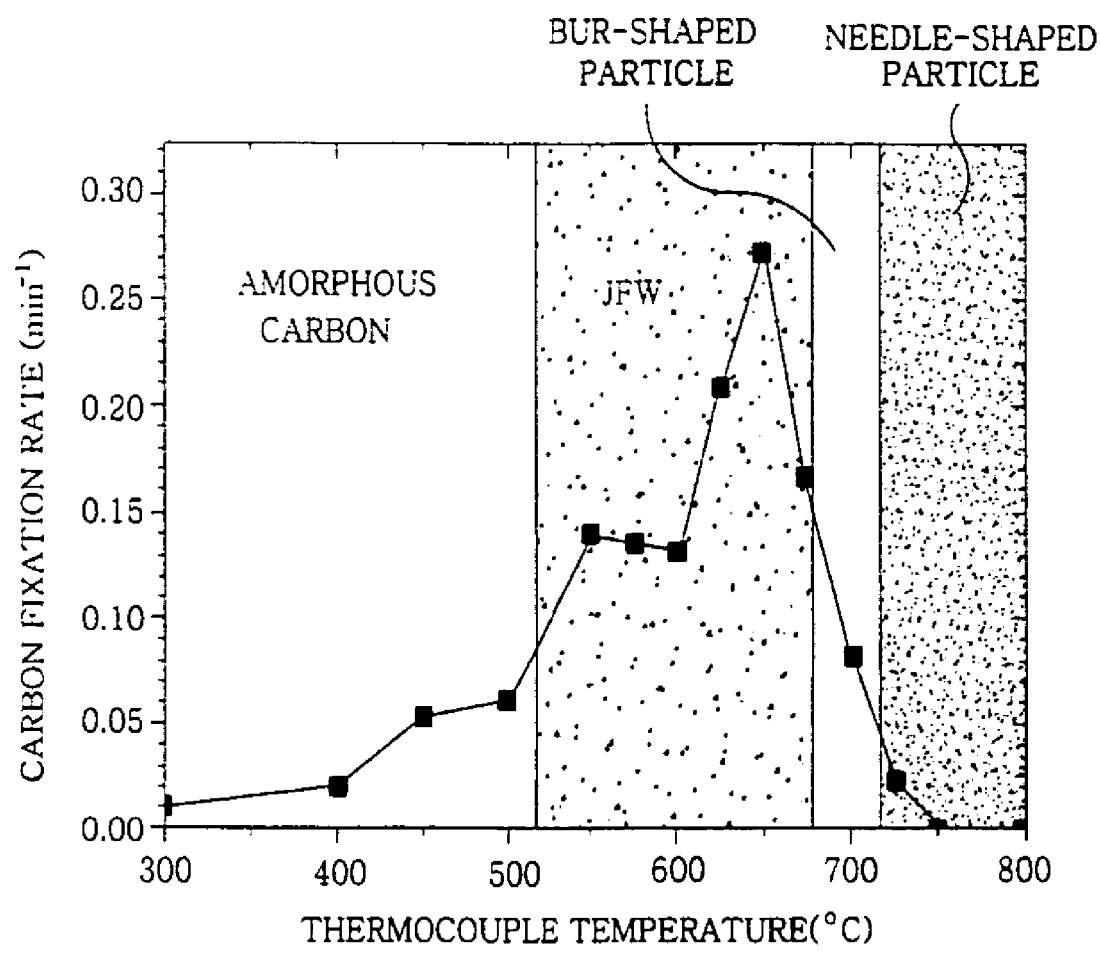
FIG. 16 shows relationships among a reaction temperature, a carbon fixation rate (i.e., a carbon deposition rate), and a type of carbon substance in accordance with a sixth embodiment of the present invention.

FIG. 16 shows relationships among a reaction temperature, a carbon fixation rate, and a type of carbon substance. The carbon fixation rate ($min^{-1}$), expressed as a formula "(total amount obtained−catalyst amount)/(catalyst amount× reaction time)", was an amount of carbon substance obtained as number of times of catalyst supply amount per unit time (1 min).

Figure 17A:
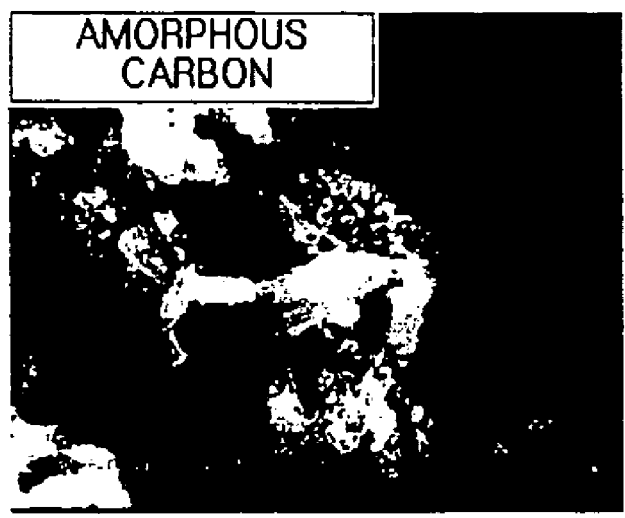
FIGS. 17A to 17D are SEM photographs showing a carbon substance manufactured by employing a method for manufacturing a carbon substance in accordance with a sixth embodiment of the present invention.
Figure 17B:
Figure 17C:
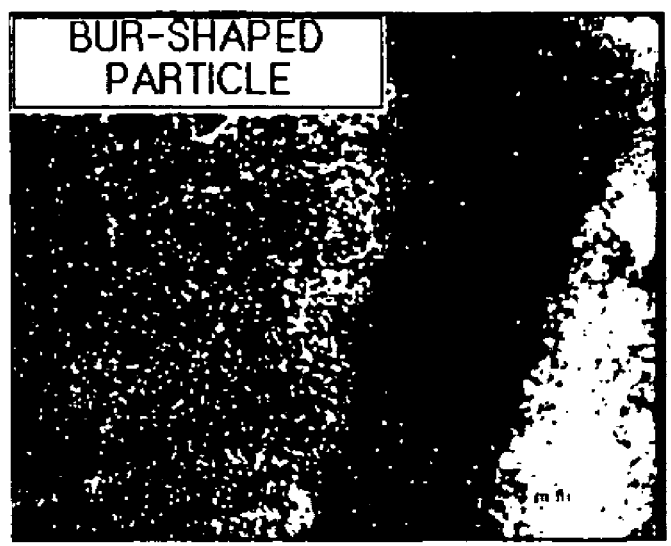
Figure 17D:
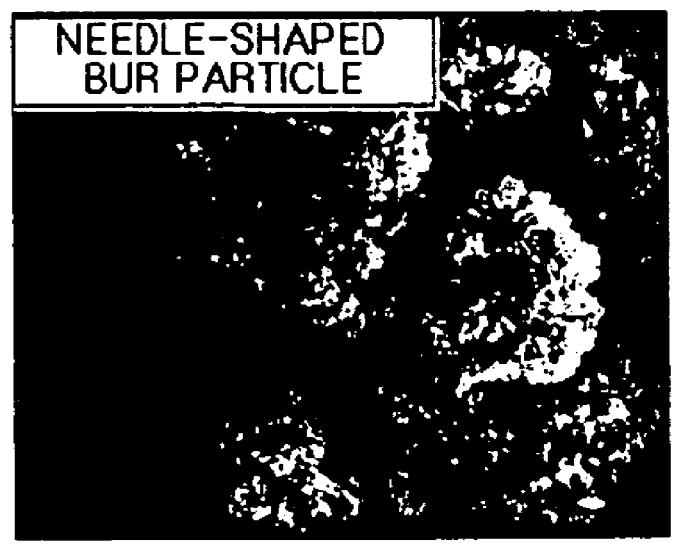

FIGS. 17A to 17D are SEM photos of the carbon substances obtained within the temperature range in FIG. 16. FIG. 17A shows a carbon substance which grew into an amorphous carbon. FIG. 17B shows a carbon substance which grew into a second carbon substance, i.e., a JFW (joint fiber web). FIG. 17C shows a carbon substance which grew into a first carbon substance, i.e., a nanotube bur-shaped particle. FIG. 17D shows a carbon substance which grew into a nanotube bur-shaped particle (However, its line-shaped bodies had a tendency to be thinner than those in FIG. 17C).

From FIGS. 16 and 17A to 17D, it can be known that, under identical manufacturing conditions, a joint fiber web grows at a temperature ranging from about 550° C. to about 700° C.; and a nanotube bur-shaped particle grows at a temperature ranging from about 675° C. to about 750° C.

(3) Position of Catalyst Substrate

In the seventh example, the device in FIG. 1 was employed. But, a thermal decomposition was performed with a position of the catalyst substrate varied from the center of the electric furnace. A catalyst mixing ratio (wt %) was 4 to 6. An amount of the catalyst was 30 mg. The other conditions were identical with those of the first example.

Figure 18:
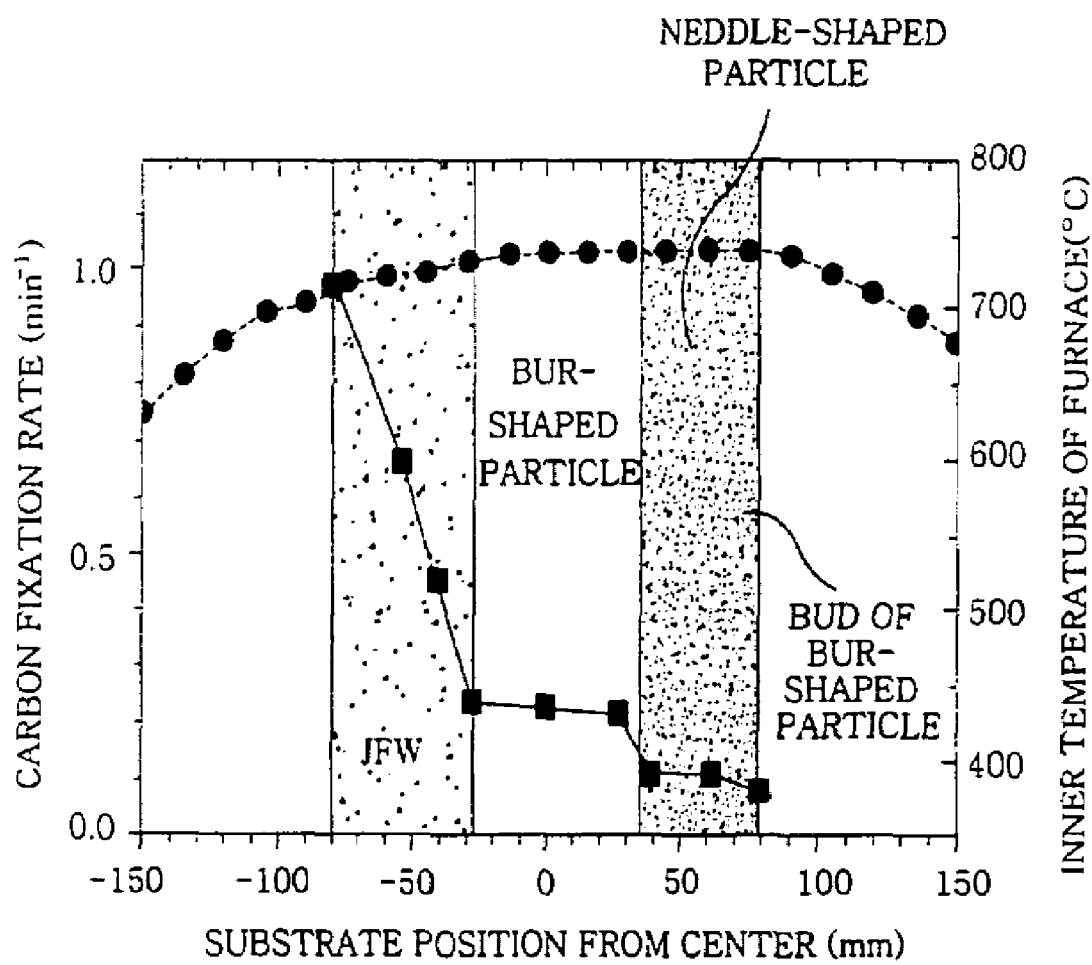
FIG. 18 shows relationships among a position of substrate, a carbon fixation rate, a temperature inside a furnace, and a type of carbon substance in accordance with a seventh embodiment of the present invention.

FIG. 18 shows relationships among a position of substrate, a carbon fixation rate, a temperature inside the furnace, and a type of carbon substance. A line connecting round dots in FIG. 18 represents the temperature inside the furnace against the position of the substrate. And a line connecting square dots represents the carbon fixation rate against the position of the substrate.

In regard to the substrate position, the center of the electric furnace being set as zero, a position close to an inflow of the source gas and the specific gas (dilution gas) was given a minus value. And a position close to an outflow of the source gas and the specific gas (dilution gas) was given a plus value.

The example was performed with the substrates 6 coated with the catalyst 5 being arranged at three different positions inside the reaction furnace.

Figure 19A:
FIGS. 19A to 19D are SEM photographs showing a carbon substance manufactured by employing a method for manufacturing a carbon substance in accordance with a seventh embodiment of the present invention.
Figure 19B:
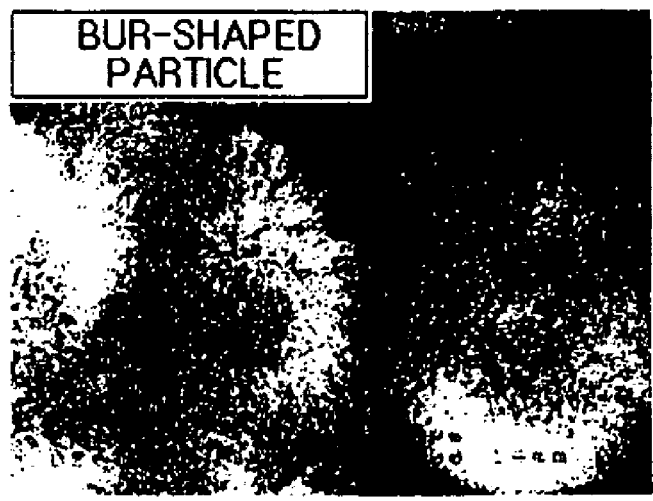
Figure 19C:
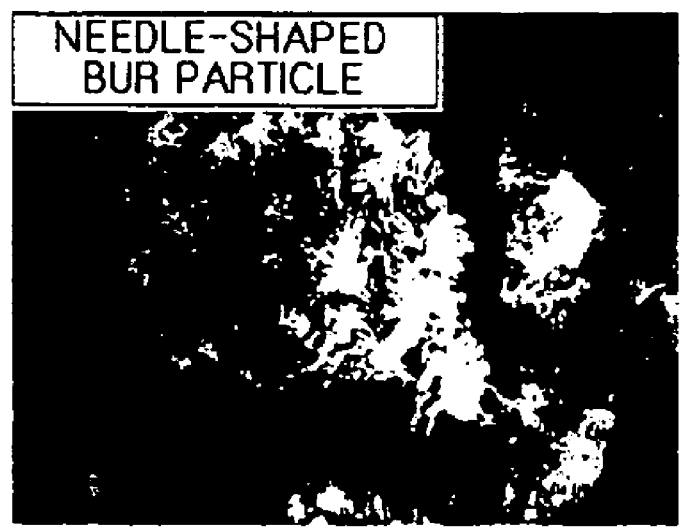
Figure 19D:
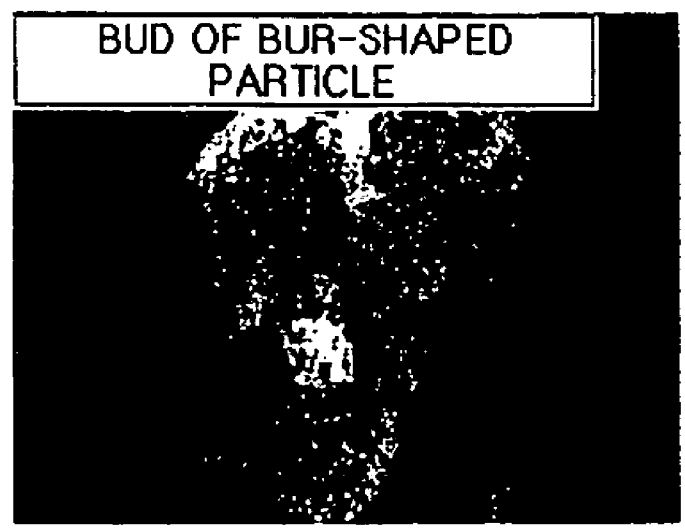

FIGS. 19A to 19D are SEM photos of the carbon substances obtained at the substrate position in FIG. 18. As shown in FIG. 19A, a JFW (joint fiber web) grew at positions ranging from −80 to −30. As shown in FIG. 19B, a nanotube bur-shaped particle grew at positions ranging from −30 to +30. As shown in FIGS. 19C and 19D, a nanotube bur-shaped particle (a nanotube needle-shaped particle having line-shaped bodies thinner than those in FIG. 19B or a bud of a bur-shaped particle) grew at positions ranging from +30 to +80.

The normal bur particle and the distinct bur-shaped particle (needle-shaped bur particle) had the following differences.

The normal bur particle had a particle including a catalyst or a catalyst oxide at a vertical hem of its fiber. And the fiber originated from its vertical hem. (Its growing mechanism was a vertical hem growth.) The fibers grew in a radial manner. The fiber was of a length ranging about 200 nm thick and from 100 nm to 100 µm.

The needle-shaped bur particle did not have a catalyst particle at a vertical hem of its fiber. And the fiber originated from the base structure. (Its growing mechanism was a root growth.) Although the fibers crew in a radial manner on the whole, they grew parallel locally. The fiber was of thickness ranging from 10 nm to 80 nm (thinner than the normal bur particle) and of a length ranging from 100 nm to 5 µm.

(4) Gas Flow Rate

In the eighth example, the device in FIG. 1 was employed. But, flow rates of a source gas and a specific gas were varied. The other conditions were identical with those of the first example.

Figure 20:
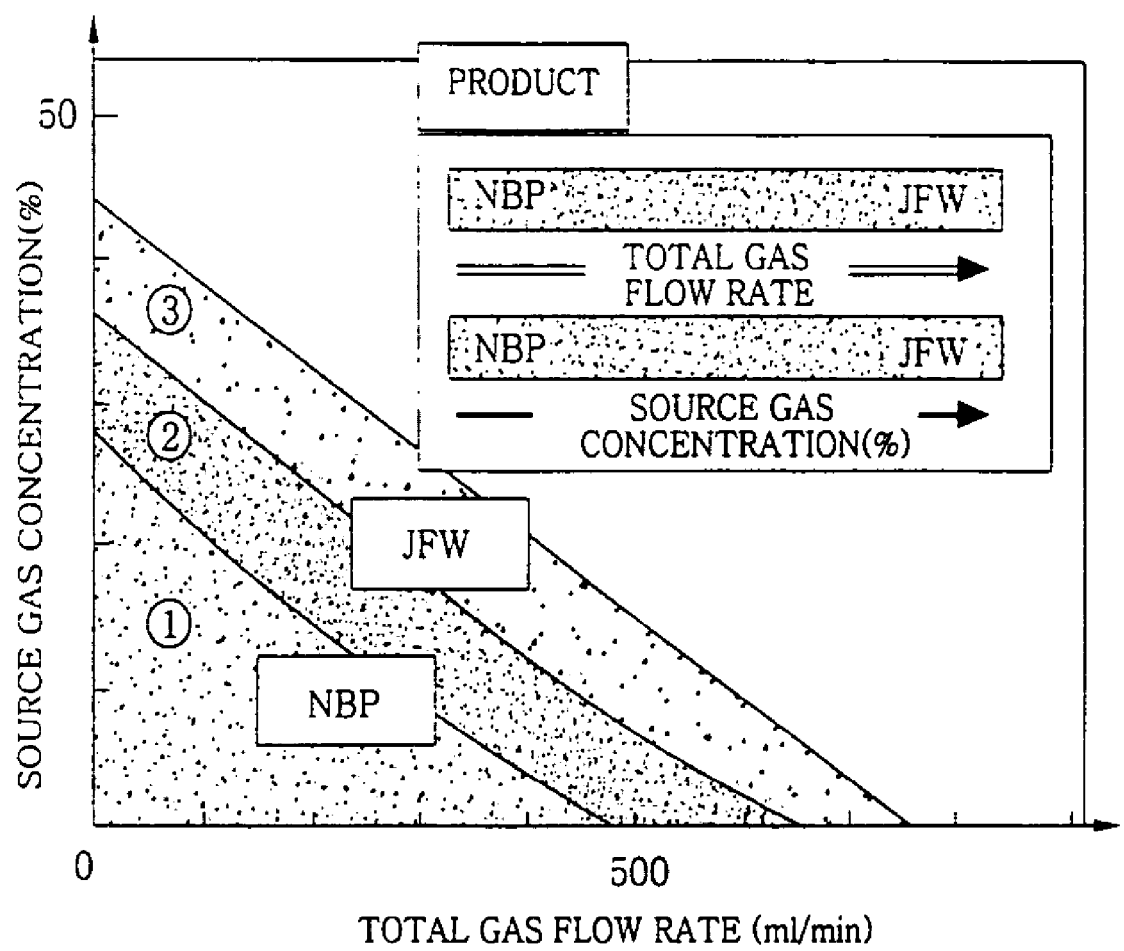
FIG. 20 shows a relationship between a gas flow rate and a type of carbon substance in accordance with an eighth embodiment of the present invention.

FIG. 20 shows a relationship between a total gas flow rate, a source gas concentration, and a type of carbon substance. As shown in FIG. 20, under identical manufacturing conditions, a joint fiber web grows easily when the total gas flow rate is large (a source gas flow rate plus a specific gas flow rate). In like manner, a joint fiber web grows easily as the source gas flow rate occupies a large part of the total gas flow rate.

In FIG. 20, a bur-shaped particle selectively grew in area ①, both of the bur-shaped particle and the joint fiber web grew in area ②, and a joint fiber web selectively grew in area ③.

(5) Reaction Time

In the ninth example, the device in FIG. 1 was employed. But, a reaction time was varied from 1 min to 12 min. A catalyst mixing ratio (wt %) was 4 to 6. A catalyst amount was 30 mg. The other conditions were identical with those of the first example.

Figure 21:
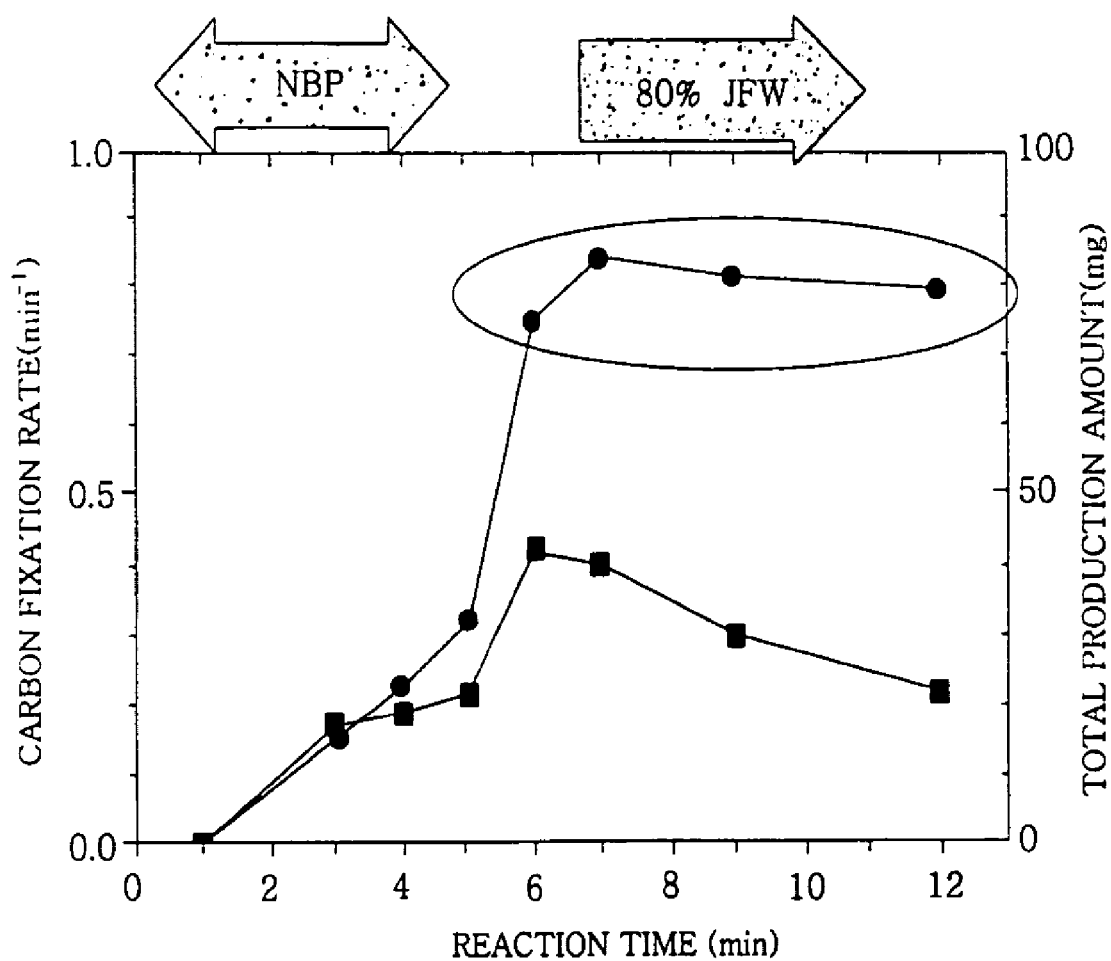
FIG. 21 shows relationships among a reaction time, a carbon fixation rate, a temperature inside a furnace, and a type of carbon substance in accordance with a ninth embodiment of the present invention.

FIG. 21 shows relationships among a reaction time, a carbon fixation rate, a total production amount, and a type of carbon substance. A line connecting round dots in FIG. 21 represents the total production amount against the reaction time. And a line connecting square dots represents the carbon fixation rate against the reaction time. As shown in FIG. 21, under identical conditions, a nanotube bur-shaped particle grew when the reaction time was below 6 minutes. When the reaction time was 6 minutes or more, more than 80% of the total product was a joint fiber web. As is indicated with an oval in FIG. 21, the total production amount was saturated at 6 minutes of reaction time.

From the above-described examples from fifth to ninth, the following can be known.

① Regarding to the catalyst, a nanotube bur-shaped particle (the first carbon substance) and a joint fiber web (the second carbon substance) can be synthesized by using a catalyst including Ni or Ni oxide and In or In oxide.

② Regarding to the catalyst mixing ratio, a range from 3:7 to 7:3 can be employed. And a range from 4:6 to 6:4 is more desirable.

③ Regarding to the amount of heat, the nanotube bur-shaped particle requires a large amount of heat for reaction. And the joint fiber web requires a smaller amount of heat than the nanotube bur-shaped particle.

④ Regarding to the position of catalyst substrate from the center of the electric furnace, a position ranging from −25 mm to +25 mm is desirable for the nanotube bur-shaped particle. And a position ranging from −80 mm to 0 mm is desirable for the joint fiber web.

⑤ Regarding to the reaction temperature, a temperature ranging from about 675° C. to about 750° C. is desirable for the nanotube bur-shaped particle; and a temperature ranging from about 550° C. to about 700° C. is desirable for the joint fiber web. Temperature ranges from about 675° C. to about 725° C. and from about 600° C. to about 650° C. are desirable for the nanotube bur-shaped particle and for the joint fiber web, respectively.

⑥ Regarding to the source gas concentration, ratio ranges from about 10% to about 40% and from about 20% to about 50% are desirable for the nanotube bur-shaped particle and for the joint fiber web, respectively.

⑦ Regarding to the total gas flow rate, flow rates from about 180 sccm to about 600 sccm and from about 300 sccm to about 720 sccm are desirable for the nanotube bur-shaped particle and for the joint fiber web, respectively.

⑧ Regarding to the production amount, an amount of the joint fiber web was about 5 times as large as that of the nanotube bur-shaped particle.

The tenth example of the present invention will now be described.

Figure 22:
FIG. 22 is a SEM photograph showing a third carbon substance manufactured by employing a method for manufacturing a carbon substance in accordance with a tenth embodiment of the present invention.
Figure 23:
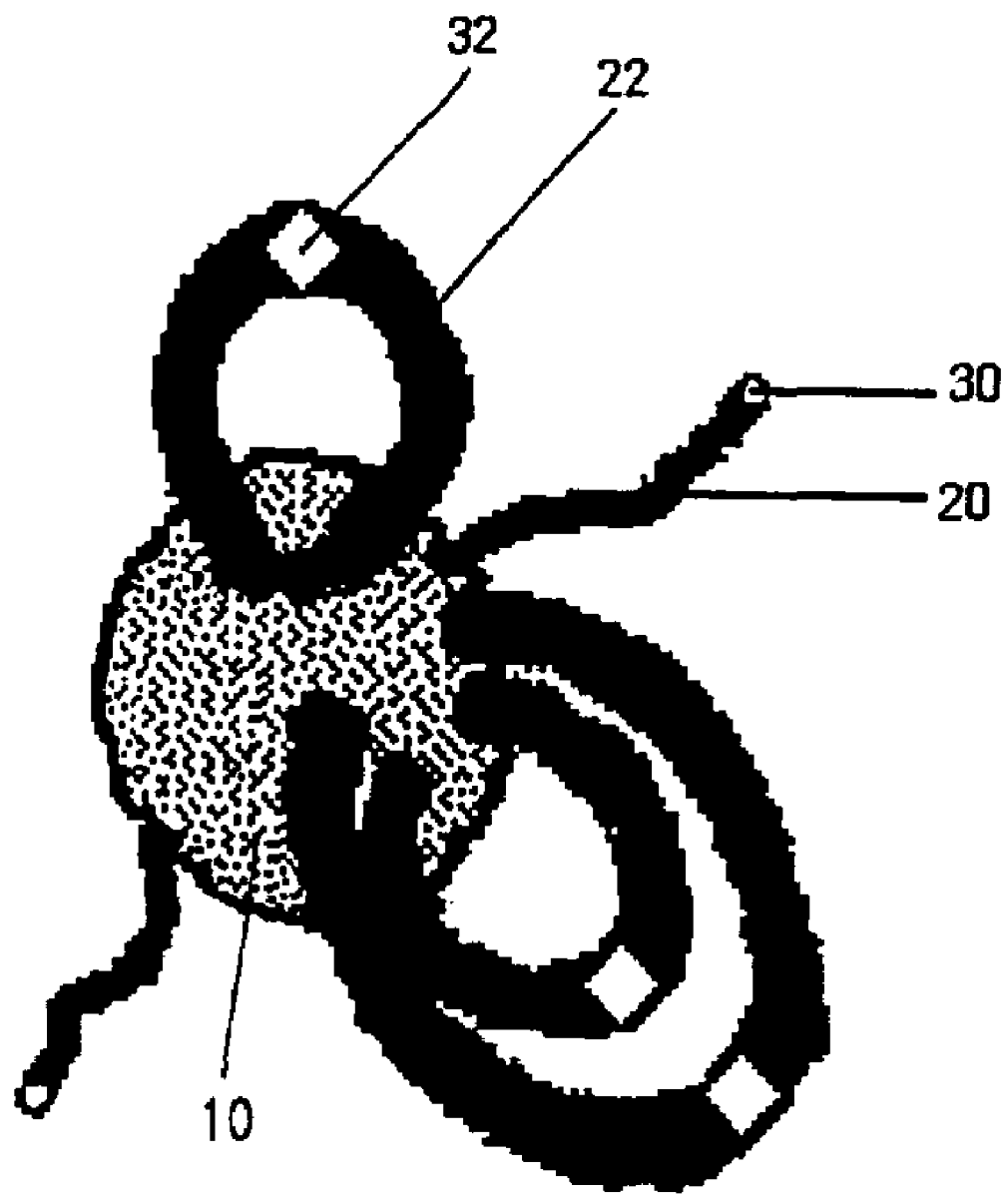
FIG. 23 schematically shows a structure of the third carbon substance in accordance with the tenth embodiment of the present invention.

In the tenth example, a manufacturing device and conditions were identical with those of the second example. FIG. 22 shows the third carbon substance in accordance with the tenth example. FIG. 22 is a SEM photo of the carbon substance grown on a substrate. FIG. 23 shows a schematically illustrated structure of the carbon substance.

As shown in FIGS. 22 and 23, the third carbon substance included the base structure 10 of diameter ranging from about 1 to 100 µm and the line-shaped body 22 whose diameter ranges from about 50 nm to about 1 µm, the line-shaped body having a loop shape originating from a surface of the structure 10 and returning to the same, and further the line-shaped body having the catalyst particle 32 therein. The line-shaped body was identical with the loop fiber of the carbon substance in accordance with the second example. The loop fiber 22 was a line-shaped body having a joint of the catalyst 32. The joint catalyst is located at one position. The position is almost in the middle of the loop fiber. That is, distances from the joint catalyst to the structure 10 were approximately same.

As the line-shaped body 20, other than the loop fiber, there was a jointless fiber. This was identical with that of the carbon substance in accordance with the first example.

A large number of third carbon substances were produced together with the second carbon substances. An EDX analysis of the third carbon substance is identical with that of the second carbon substance shown in FIG. 12.

In each of the above examples, a compound of NiO and $In_2O_3$ or Ni and In was used as the catalyst 5. The carbon substances, however, could be made by using a compound catalyst of Ni and $In_2O_3$, NiO and In, or the like.

For the catalyst particle, products of Kojundo Chemical Laboratory Co., Ltd. were used, which were Ni(code number: NIE02PB, particle size: 2 to 3 µm), NiO (code number:

NIO02PB, particle size: 7 µm, degree of purity: 99.9%), In (code number: INE01PB, particle size: 45 µm, degree of purity: 99.9%), and $In_2O_3$ (code number: INO0.PB, particle size: 1 µm, degree of purity: 99.99%).

In each of the above examples, a powder was mounted on the substrate 6 as the catalyst 5. The catalyst 5 can be coated on the substrate 6 as one mixture layer or as two separate layers.

The catalytic substrate method (A substrate is coated with a catalyst.) has characteristics that: a product can be easily controlled by adjusting the catalyst layer thickness; and the product can be produced regularly all over the substrate. In a meanwhile, the catalytic powder method has characteristics that: a coating process is unnecessary, a powder (fine particle) commercially available can be used, and a mass synthesizing (10 times the catalytic substrate method) can be realized.

It is believed that: of the metal catalyst 5, Ni or NiO works for absorption of carbon and deposition of fiber-shaped carbon substance; and In or In2O3 works for amplifying the function of Ni.

The specific gas was flowed since the source gas would not flow regularly in the reaction furnace 1 if the specific gas flow rate did not occupy more than a certain ratio in the total gas flow rate. In case only the source gas is flowed at a small flow rate, devoid of the inert gas flow, there is a small probability of the source material encountering the catalyst. Further, depending on the presence and absence of the dilution gas, decomposition way of the source gas can be changed.

From the experiment result, it is appropriate that a dilution ratio of the specific gas {=source gas/(source gas+dilution gas)} range from about 5 to about 40%. And it is desirable that the flow rate of the specific gas be 800 sccm or below (reaction furnace diameter: 45 mm, effective heating length: 200 mm).

The flow rate of the gas including carbon (source gas) is advisable to be 250 sccm or below (reaction furnace diameter: 45 mm, effective heating length: 200 mm).

Although the reaction time at the reaction process was 3 minutes after the source gas was introduced, the reaction time was not confined to 3 minutes. For instance, the reaction time was 10 minutes or below when a quartz tube having a diameter of 45 mm (effective heating length 200 mm) and 10 mg of catalyst were used. When 30 mg of catalyst was used, with the source gas flow rate being 180 sccm, the carbon substance production was saturated at 7 minutes of reaction time, having about 110 mg of production amount at its maximum (including the initial catalyst amount). As the source gas, gases including carbon other than $C_2H_2$ could be used.

In view of the flow rate and the thermal decomposition rate of the source gas, at least about 1 min is required in simple thermal CVD (the method used in the above examples) However, a shorter time, e.g., 1 second, may be enough for reaction in case a hot filament or plasma is employed. When the flow rate of the source gas is small, the manufacturing time becomes long. When a large amount of catalyst is used, a long time manufacturing becomes possible.

The first and the second carbon substances can be made separately in accordance with the react-on temperature. The nanotube bur-shaped particle is made at a temperature range from about 675° C. to about 750° C. And the joint fiber web is made at a temperature range from about 550° C. to about 700° C. More desirably, the temperature ranges are from about 675° C. to about 725° C. for the nanotube bur-shaped particle and from about 600° C. to about 650° C. for the joint fiber web. Herein, within the overlapping temperature range (from about 675° C. to about 700° C.), one of the two substances or both of them can be made.

The point of the cooling process is that the synthesized substance (carbon substance) does not encounter oxygen until it is sufficiently cooled (below 400° C., usually below 200° C.). It is because the carbon substance becomes oxidized (burned) when it encounters oxygen at high temperature.

Generation mechanisms for the first carbon substance of the first example and the second carbon substance of the second example will now be described. Regarding to this, there are a lot of uncertain points, but the inventors think that the carbon substances are formed in accordance with the following generation mechanisms.

Figure 24A:
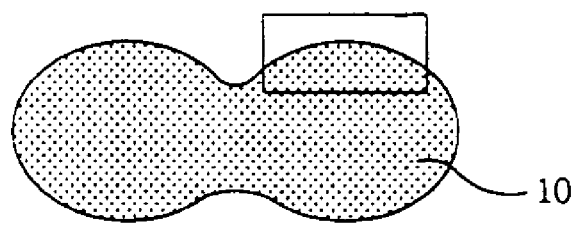
FIGS. 24A to 24C illustrate generation mechanism of the first carbon substance in accordance with the first embodiment of the present invention.
Figure 24B:
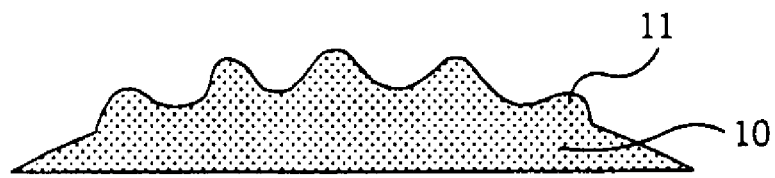
Figure 24C:
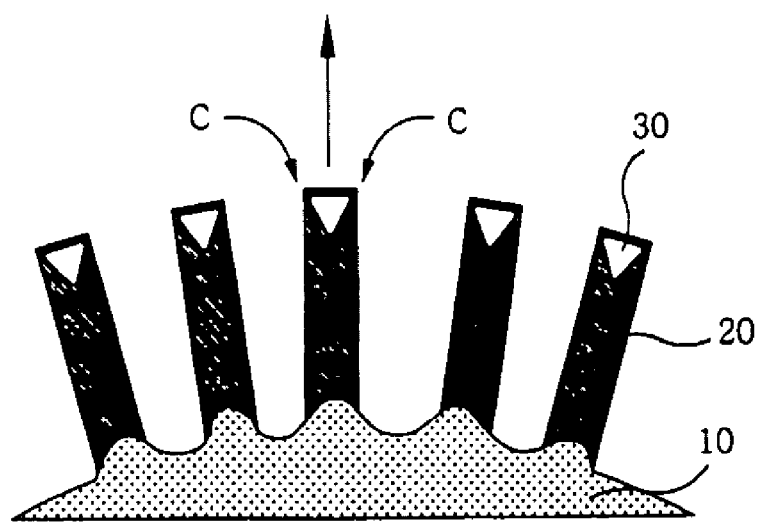

FIGS. 24A to 24C show a generation model for the first carbon substance. Both FIGS. 24B and 24C are magnified views of a square portion in FIG. 24A.

As shown in FIG. 24A, in the first place, Ni (or its oxide) and In (or its oxide), alloys, alloy oxides, or a mixture thereof formed a core particle (structure 10). FIG. 22B is a magnified view of a surface of the core particle.

Next, as shown in FIGS. 24B and 24C, seed particles (catalysts 11 on the surface of the structure) were formed on the surface of the core particle. As a seed catalyst (the catalyst 30 formed by separation of the whole or a part of the catalyst 11) separated from the surface of the core particle, a tube-shaped nanofiber (the line-shaped body 20) was formed. The seed catalyst was of a shape of circular cone or polygonal pyramid. The nanotube grew at its vertical hem. When the carbon decomposed at the catalyst surface reached a supersaturation, the carbon was deposited in a fiber shape. Since it was difficult for the carbon to reach a vertical hem of the cone or pyramid-shaped catalyst, the deposited carbon fiber had a tube shape.

Figure 25A:
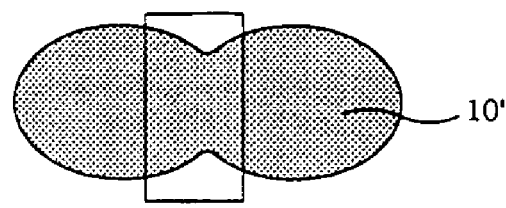
FIGS. 25A to 25C illustrate generation mechanism of the second carbon substance in accordance with the second embodiment of the present invention.
Figure 25B:
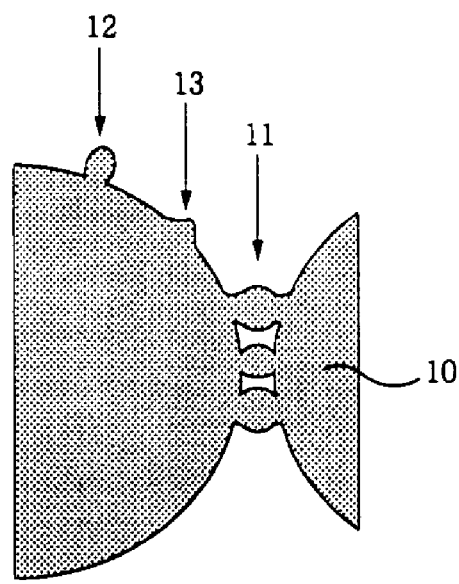
Figure 25C:
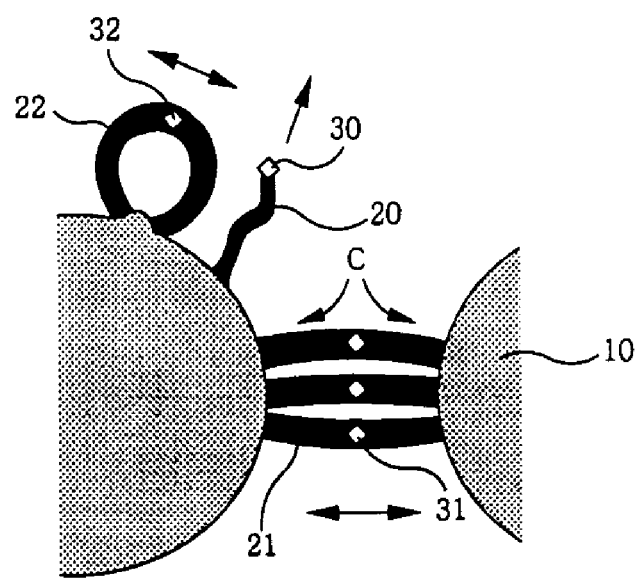

FIGS. 25A to 25C show a generation model for the second carbon substance. Both FIGS. 25B and 25C are magnified views of a square portion in FIG. 25A.

As shown in FIGS. 25A and 25B, Ni (or its oxide) and In (or its oxide), alloys, alloy oxides, or a mixture thereof formed a precursor 10' of a site core particle. Seed particles (catalysts 11, 12 and 13 on a surface of the structure: it is considered that the catalysts 31, 32 and 30 were formed by separation of the entirety of or a part of each catalysts) were formed on a surface of the precursor. The seed catalysts 31 and 32 had a shape of a combination of two circular cones or polygonal pyramids.

As shown in FIG. 25C, a carbon fiber (the line-shaped body 21) was deposited from both sides of the seed particle (the catalyst 11). Accordingly, a carbon fiber deposited from a seed particle on a boundary of a site core precursor disconnects site cores. In the meantime, a carbon fiber (line-shaped body 22) deposited from a seed particle (catalyst 12) on the surface of the site core precursor formed a joint nanofiber having a loop shape by returning to an identical site core from which it started. Further, a carbon fiber (the line-shaped body 20) deposited from a seed particle (the catalyst 13) on the surface of the site core precursor formed a jointless fiber which was a tube-shaped nanofiber thinner than the joint fiber and did not return to the site core where it started.

In this manner, the second carbon substance (joint web fiber) was composed of a site core particle (a metal or its oxide), a joint fiber connecting site core particles, a joint fiber starting from and returning to an identical site core, and a tube-shaped nanofiber (jointless fiber) which was thinner than the joint fiber and grew from the site core particle. The jointless fiber was almost identical with the line-shaped body of the nanotube bur-shaped particle.

A generation model for the third carbon substance is identical with that for the second carbon substance except that the site core particles (structure 10) are separated from the outset and therefore the third carbon substance does not have a joint fiber connecting site core particles.

Figure 26:
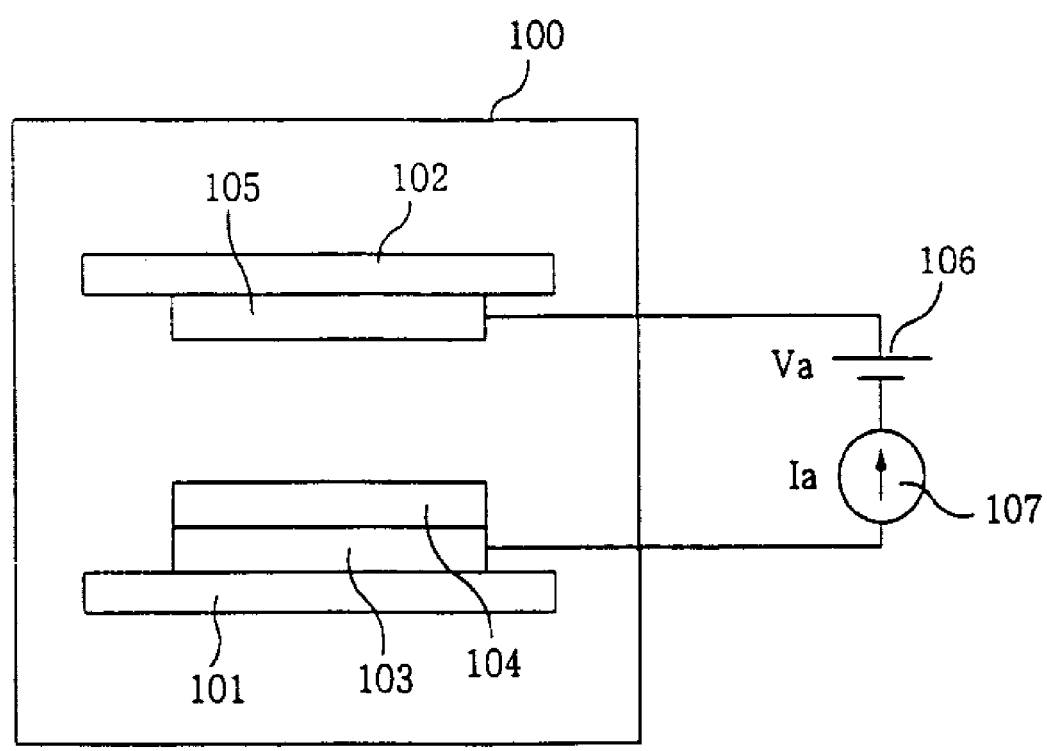
FIG. 26 schematically shows a device to measure an electron emission characteristic of the electron emission element in accordance with the preferred embodiments of the present invention.

FIG. 26 shows a device to measure an electron emission characteristic of an electron emission element. This measuring device measures an electron emission characteristic of an electron emission element (electron emission source) which uses the carbon substances in accordance with the present invention as an electron emission material.

In FIG. 26, substrates (a cathode substrate 101 and an anode substrate 102) made of glass are arranged facing each other inside a vacuum chamber 100. A cathode electrode 103 made of ITO (indium tin oxide) and a layer (emitter layer) including the first carbon substance 104 are formed on the substrate 101. An anode electrode (radiation electrode) 105 made of aluminum is formed on the substrate 102. A distance between the two substrates 101 and 102 is set to be 25 μm. A DC power supply 106 and an ammeter 107 are connected to the cathode electrode 103 and the anode electrode 105 in a series.

Figure 27:
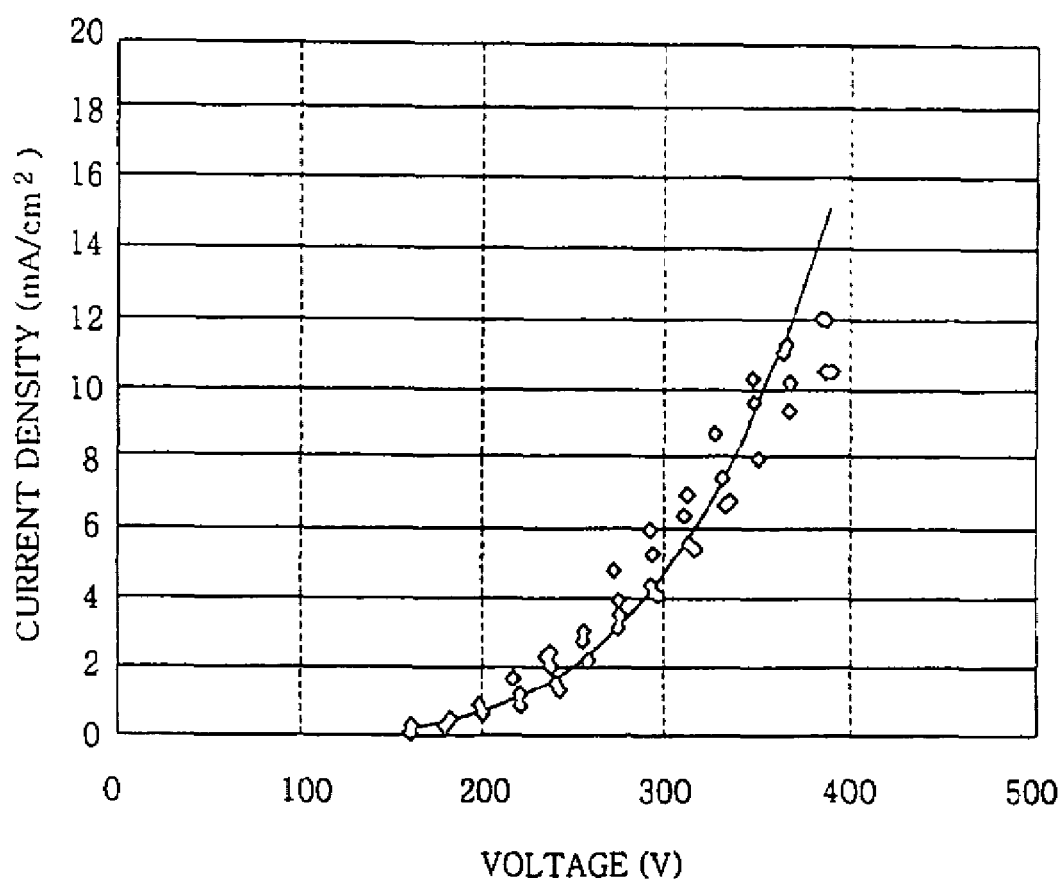
FIG. 27 depicts an electron emission characteristic (V-I characteristic curve) of the electron emission element using the first carbon substance in accordance with the first embodiment of the present invention.
Figure 28:
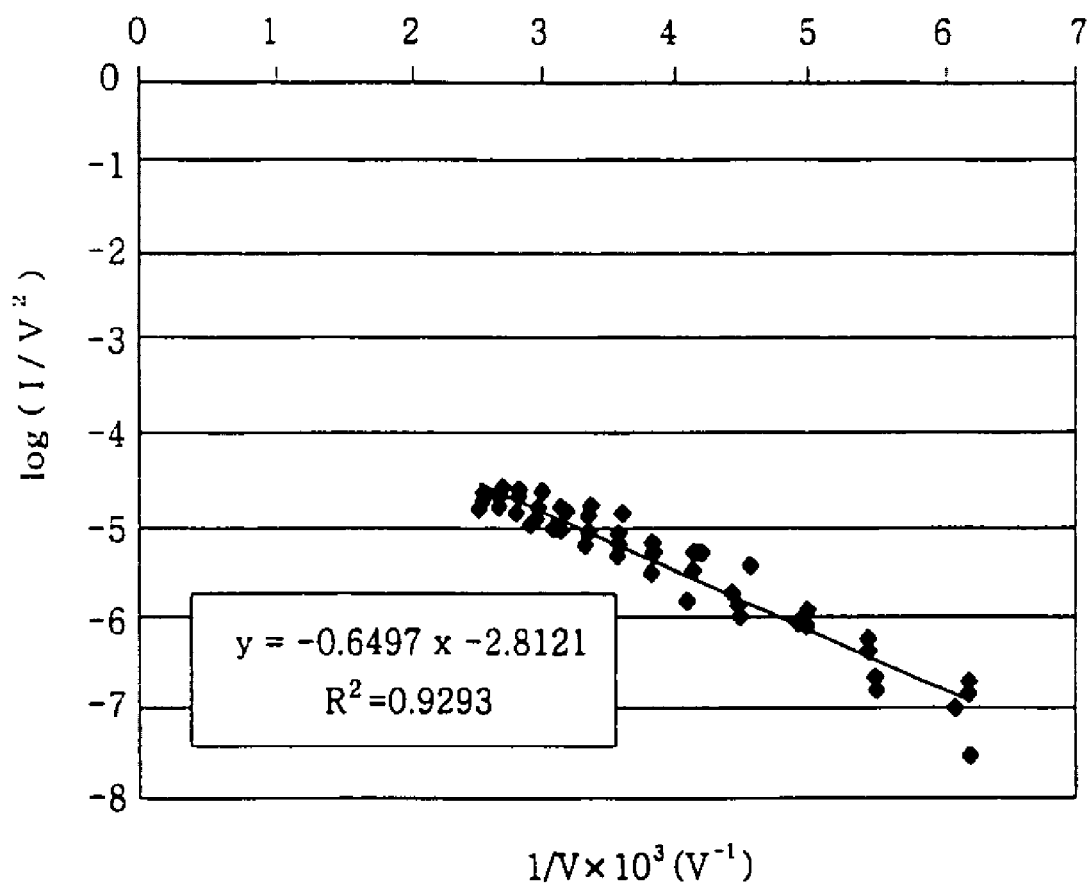
FIG. 28 depicts an electron emission characteristic (F-N plot) of the electron emission element using the first carbon substance in accordance with the first embodiment of the present invention.

FIGS. 27 and 28 show data of an electron emission characteristic of an electron emission element using the first carbon substance as an electron emission material obtained by using the measuring device in FIG. 26.

FIG. 27 shows an analysis of voltage (V)—current (I) characteristic. FIG. 28 is a Fowler-Nordheim (F-N) plot thereof. As shown in FIGS. 27 and 28, an electric field electron emission is performed.

A layer including the first carbon substance 104 was formed, after the first carbon substance was pulverized into paste and printed on the cathode electrode 103 in a desired pattern, by drying it in the air at 500° C. for 10 minutes.

A distance between the two substrates 101 and 102 was set to be 25 μm. But a distance between the carbon substance and the anode electrode 105 was shorter than 25 μm since the substrate 101 was coated with the carbon substance which swelled.

An identical test was performed to measure an electron emission characteristic of an electron emission element by using the second carbon substance in accordance with the present invention as an electron emission material.

When the second carbon substance (joint web fiber) is used as an electron emission material, a jointless fiber serves for electron emission. However, it is considered that the joint fiber scarcely serves for electron emission. For that reason, the joint fibers need to be used after being divided at the catalyst portion by performing a supersonic process or a mechanical process with the entire second carbon substance. And this is the same for the third carbon substance.

In accordance with the present invention, a new carbon substance and a method or manufacturing the same, particularly, a carbon substance suitable for an electron emission element and a method for manufacturing the same, are provided. Further, an electron emission element having a good electron emission characteristic is provided. Furthermore, in accordance with the present invention, a composite material which adheres superiorly to matrices of various kinds is provided. Particularly, an electromagnetic wave-absorbing material which absorbs electromagnetic waves efficiently is provided.

A carbon substance and a method for manufacturing the same are provided, which is suitable for an electrode for primary cell, an electrode or a mixing material in an electrode for secondary cell, a catalyst carrier for fuel cell, a material for gas storage device, a filter for gas or liquid purification device, a lubricant, an abrasive for metal, ceramics, glass and the like.

While the invention has been shown and described with respect to the preferred embodiments, it will be understood by those skilled in the art that various changes and modifications may be made without departing from the spirit and scope of the invention as defined in the following claims.

What is claimed is:

1. A carbon substance comprising:
   a structure having a diameter ranging from about 1 μm to about 100 μm and including carbon and a metal or a metallic oxide; and
   a plurality of line-shaped bodies whose diameters are smaller than about 200 nm,
   wherein the line-shaped bodies include carbon as a main component thereof and grow radially from a surface of the structure; and
   wherein the structure has a curved shape of sphere, hemisphere, ellipse or half ellipse.

2. A carbon substance comprising:
   a plurality of structures, each having a diameter ranging from about 1 μm to about 100 μm and including carbon and a metal or a metallic oxide; and
   one or more line-shaped bodies whose diameters range from about 50 nm to about 1 μm, wherein the line-shaped bodies include carbon as a main component thereof and grow from surfaces of the structures; and
   wherein at least parts of the line-shaped bodies connect two or more separate structures.

3. The carbon substance of claim 2, wherein each of the line shaped bodies further includes a particle containing at least a metal or a metallic oxide.

4. A carbon substance comprising:
   one or more structures, each having a diameter ranging from about 1 μm to about 100 μm and including carbon and a metal or a metallic oxide; and
   one or more line-shaped bodies whose diameters range from about 50 nm to about 1 μm,
   wherein the line-shaped bodies include carbon as a main component thereof and grow from surfaces of the structures;
   wherein the line-shaped bodies include at least one body starting from and returning to a same structure; and
   wherein at least parts of the line-shaped bodies connect two or more separate structures.

5. An electron emission element which emits electrons from an electron emission material by using a voltage difference between a first electrode and a second electrode, wherein the electron emission material is arranged on the first electrode and the second electrode is arranged facing the electron emission material, wherein the electron emission material comprises the carbon substance of claim 1.

6. An electron emission element which emits electrons from an electron emission material by using a voltage difference between a first electrode and a second electrode, wherein the electron emission material is arranged on the first electrode and the second electrode is arranged facing the electron emission material, and wherein the electron emission material comprises the carbon substance of claim 2.

7. The electron emission element of claim 6, wherein the line-shaped bodies of the carbon substance are divided to direct in a radial manner.

8. A composite material comprising the carbon substance of claim 1 in a matrix.

9. A composite material comprising the carbon substance of claim 2 in a matrix.

10. A method for manufacturing the carbon substance of claim 1 by a thermal decomposition of a source gas having carbon in the vicinity of a catalyst, wherein the catalyst comprises a first and a second materials, the first material being Ni or a Ni oxide and the second material being In or an In oxide; and the thermal decomposition is performed at a temperature ranging from about 675° C. to about 750° C.

11. A method for manufacturing the carbon substance of claim 2 by a thermal decomposition of a source gas having carbon in the vicinity of a catalyst, wherein the catalyst comprises a first material and a second material, the first material being Ni or a Ni oxide and the second material being In or an In oxide; and the thermal decomposition is performed at a temperature ranging from about 550° C. to about 700° C.

12. An electron emission element which emits electrons from an electron emission material by using a voltage difference between a first electrode and a second electrode, wherein the electron emission material is arranged on the first electrode and the second electrode is arranged facing the electron emission material, and wherein the electron emission material comprises the carbon substance of claim 4.

13. The electron emission element of claim 12, wherein the line-shaped bodies of the carbon substance are divided to direct in a radial manner.

14. A composite material comprising the carbon substance of claim 4 in a matrix.

15. A method for manufacturing the carbon substance of claim 4 by a thermal decomposition of a source gas having carbon in the vicinity of a catalyst, wherein the catalyst comprises a first material and a second material, the first material being Ni or a Ni oxide and the second material being In or an In oxide; and the thermal decomposition is performed at a temperature ranging from about 550° C. to about 700° C.

16. The carbon substance of claim 4, wherein each of the line shaped bodies further includes a particle containing at least a metal or a metallic oxide.

* * * * *